United States Patent
Chopra et al.

(10) Patent No.: US 10,122,192 B2
(45) Date of Patent: *Nov. 6, 2018

(54) SENSE COIL GEOMETRIES WITH IMPROVED SENSITIVITY FOR METALLIC OBJECT DETECTION IN A PREDETERMINED SPACE

(71) Applicant: QUALCOMM Incorporated, San Diego, CA (US)

(72) Inventors: Swagat Chopra, Munich (DE); Leandro Alberto Percebon, Munich (DE); Michael Werner, Markt Schwaben (DE)

(73) Assignee: QUALCOMM Incorporated, San Diego, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 14/818,051

(22) Filed: Aug. 4, 2015

(65) Prior Publication Data

US 2016/0238731 A1 Aug. 18, 2016

Related U.S. Application Data

(60) Provisional application No. 62/117,361, filed on Feb. 17, 2015.

(51) Int. Cl.
*G01R 27/28* (2006.01)
*H02J 7/00* (2006.01)
(Continued)

(52) U.S. Cl.
CPC .......... *H02J 7/0042* (2013.01); *B60L 11/182* (2013.01); *B60L 11/1829* (2013.01);
(Continued)

(58) Field of Classification Search
CPC .......... H02J 17/00; H02J 50/10; H02J 7/0027; H02J 7/0029; H02J 7/045; H02J 7/0013;
(Continued)

(56) References Cited

U.S. PATENT DOCUMENTS 6,631,847 B1 10/2003 Kasahara et al.
6,657,577 B1 12/2003 Gregersen et al.
(Continued)

FOREIGN PATENT DOCUMENTS

GB 2133660 A 7/1984
GB 2449736 A 12/2008
(Continued)

OTHER PUBLICATIONS

International Search Report and Written Opinion—PCT/US2016/013929 ISA/EPO—dated Apr. 25, 2016.

*Primary Examiner* — Vinh Nguyen
(74) *Attorney, Agent, or Firm* — Knobbe, Martens, Olson & Bear, LLP

(57) ABSTRACT

This disclosure provides systems, methods and apparatus for detecting a presence of an object. In one aspect an apparatus for detecting a presence of an object is provided. The apparatus includes a sense coil formed from a conductor having a predetermined shape configured to attenuate currents induced in the conductor by an external time-varying magnetic field. The sense coil has an electrical characteristic that varies as a function of the presence of the object. The apparatus comprises a detection circuit coupled to the sense coil and configured to detect the presence of the object in response to detecting a difference between a measured value of the electrical characteristic and a reference value for the electrical characteristic. The reference value for the electrical characteristic is substantially the same as the measured
(Continued)

value of the electrical characteristic in the absence of the object over at least a portion of the sense coil.

20 Claims, 17 Drawing Sheets

(51) Int. Cl.
| | |
|---|---|
| *H02J 7/02* | (2016.01) |
| *G01V 3/10* | (2006.01) |
| *B60L 11/18* | (2006.01) |
| *H02J 5/00* | (2016.01) |
| *H02J 50/10* | (2016.01) |
| *H02J 50/12* | (2016.01) |
| *H02J 50/90* | (2016.01) |
| *H02J 50/80* | (2016.01) |
| *H02J 50/60* | (2016.01) |

(52) U.S. Cl.
CPC .......... *B60L 11/1833* (2013.01); *G01V 3/10* (2013.01); *G01V 3/101* (2013.01); *H02J 5/005* (2013.01); *H02J 7/025* (2013.01); *H02J 50/10* (2016.02); *H02J 50/12* (2016.02); *H02J 50/60* (2016.02); *H02J 50/80* (2016.02); *H02J 50/90* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC .......... H02J 7/0052; H02J 7/007; H02J 50/40; H02J 50/70; H02J 50/80; H02J 50/90; H02J 7/04; H02J 2007/0096; H02J 7/0068; H01F 5/003; B60L 11/182; B60L 11/1824; B60L 11/1833; B60L 11/1838; B60L 2210/40; B60L 11/1805; B60L 11/1842; B60L 2240/547; B60L 11/005; B60L 11/1831; B60L 11/185; B60L 2210/10; B60L 11/18; B60L 2240/549; B60L 2250/10; B60L 2250/16; B60L 2270/147; B60L 3/003; B60L 3/0046; B60L 5/005; B60L 11/1829; H04B 5/0087; H04B 5/0081; H04B 5/0093; H04B 5/0075; H04B 5/0031; H02M 3/3376; G01V 3/081; G01V 3/101; G01V 3/104; G01V 3/10; H03H 7/40

See application file for complete search history.

(56) References Cited

U.S. PATENT DOCUMENTS

| | | |
|---|---|---|
| 6,967,574 B1 * | 11/2005 | Nelson .................. F41H 11/136 |
| | | 324/228 |
| 7,151,430 B2 | 12/2006 | Mattsson |
| 8,260,432 B2 | 9/2012 | Digiore et al. |
| 2002/0023964 A1 | 2/2002 | Okamura et al. |
| 2004/0183534 A1 | 9/2004 | Chan et al. |
| 2010/0245011 A1 | 9/2010 | Chatzopoulos et al. |
| 2011/0009057 A1 * | 1/2011 | Saunamaki ............. H02J 7/025 |
| | | 455/41.1 |
| 2012/0181875 A1 | 7/2012 | Wechlin et al. |
| 2013/0069441 A1 | 3/2013 | Verghese et al. |
| 2013/0099592 A1 | 4/2013 | Abe |
| 2013/0099729 A1 | 4/2013 | Yoon et al. |
| 2013/0249682 A1 | 9/2013 | Van Wiemeersch et al. |
| 2014/0015522 A1 | 1/2014 | Widmer et al. |
| 2014/0044293 A1 | 2/2014 | Ganem et al. |
| 2014/0084857 A1 | 3/2014 | Liu et al. |
| 2014/0091640 A1 * | 4/2014 | Scholz ...................... H01F 38/14 |
| | | 307/104 |
| 2014/0125140 A1 | 5/2014 | Widmer et al. |
| 2014/0191586 A1 | 7/2014 | Ichikawa |
| 2016/0028265 A1 * | 1/2016 | Bell ........................ H02J 7/025 |
| | | 320/108 |
| 2016/0141881 A1 | 5/2016 | Hassan-Ali et al. |
| 2016/0241061 A1 * | 8/2016 | Werner .................. H02J 7/0042 |
| 2016/0241075 A1 | 8/2016 | Von Novak, III et al. |

FOREIGN PATENT DOCUMENTS

| | | |
|---|---|---|
| JP | 2011188459 A | 9/2011 |
| WO | WO-2014095722 A2 | 6/2014 |
| WO | WO-2014206961 A2 | 12/2014 |

* cited by examiner

C. Clover leaf sense coil

D. Double D sense coil

E. Quadruple D sense coil

SENSE COIL GEOMETRIES WITH IMPROVED SENSITIVITY FOR METALLIC OBJECT DETECTION IN A PREDETERMINED SPACE

CROSS REFERENCE TO RELATED APPLICATIONS

This application claims priority to and the benefit under 35 U.S.C. § 119(e) of U.S. Provisional Patent Application No. 62/117,361 entitled "CLOVER LEAF AND BUTTER-FLY COIL STRUCTURES FOR FLAT WIRELESS COUPLING PROFILES IN WIRELESS POWER TRANSFER APPLICATIONS" filed on Feb. 17, 2015, the disclosure of which is hereby incorporated by reference in its entirety.

FIELD

The present disclosure relates generally to wireless power transfer, and more specifically to sense coil geometries with improved sensitivity for metallic object detection in a predetermined space.

BACKGROUND

Wireless charging systems are capable of transferring power in free space, e.g., via a wireless magnetic field, to be used for charging electric vehicles. However, the wireless magnetic field may induce eddy currents in any metallic object located within a predetermined space near the wireless charging system. Such eddy currents cause the metallic object to heat up and may damage components of the wireless charging system. Sensor systems which include a plurality of sense coils may be utilized to determine the presence of such metallic objects for accordingly reducing or discontinuing wireless power transfer. However, conventional square or rectangular shaped sense coils suffer from reduced sensitivity when such metallic objects are located substantially at a center of one of these sense coils and the dimensions of the sense coils are considerably larger than the dimensions of the metallic objects. Moreover, where the sense coils are located over the magnetics of a transmitter of the wireless charging system, the wireless magnetic field generated by the transmitter may cause undesirable interference with the sense coils. As such, sense coil geometries with improved sensitivity for metallic object detection in a predetermined space are desirable.

SUMMARY

One aspect of the disclosure provides an apparatus for detecting a presence of an object. The apparatus includes a sense coil having a plurality of sides defined by a conductor. For each of the plurality of sides of the sense coil, the conductor bows toward a center of the sense coil as the conductor extends from an outer portion of the respective side of the sense coil toward a middle portion of the respective side of the sense coil. The sense coil has an electrical characteristic that varies as a function of the presence of the object. The apparatus further includes a detection circuit coupled to the sense coil and configured to detect the presence of the object in response to detecting a difference between a measured value of the electrical characteristic and a reference value for the electrical characteristic.

Another aspect of the disclosure provides some implementations of a method for detecting a presence of an object. The method comprises determining a measured value of an electrical characteristic of a sense coil that varies as a function of the presence of the object. The sense coil has a plurality of sides defined by a conductor, For each of the plurality of sides of the sense coil, the conductor bows toward a center of the sense coil as the conductor extends from an outer portion of the respective side of the sense coil toward a middle portion of the respective side of the sense coil. The method further includes detecting the presence of the object in response to detecting a difference between the measured value of the electrical characteristic and a reference value for the electrical characteristic.

Yet aspect of the disclosure provides an apparatus for detecting a presence of an object. The apparatus includes a sense coil having an outer loop and an inner loop defined by a conductor that crosses itself at a transition between the outer loop and the inner loop. The sense coil has an electrical characteristic that varies as a function of the presence of the object. The apparatus further includes a detection circuit coupled to the sense coil and configured to detect the presence of the object in response to detecting a difference between a measured value of the electrical characteristic and a reference value for the electrical characteristic.

Yet another aspect of the disclosure provides some implementations of a method for detecting a presence of an object. The method comprises determining a measured value of an electrical characteristic of a sense coil that varies as a function of the presence of the object. The sense coil has an outer loop and an inner loop defined by a conductor that crosses itself at a transition between the outer loop and the inner loop. The method further includes detecting the presence of the object in response to detecting a difference between the measured value of the electrical characteristic and a reference value for the electrical characteristic.

DETAILED DESCRIPTION

The detailed description set forth below in connection with the appended drawings is intended as a description of implementations and is not intended to represent the only implementations in which the invention may be practiced. The term "exemplary" used throughout this description means "serving as an example, instance, or illustration," and should not necessarily be construed as preferred or advantageous over other implementations. The detailed description includes specific details for the purpose of providing a thorough understanding of the implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
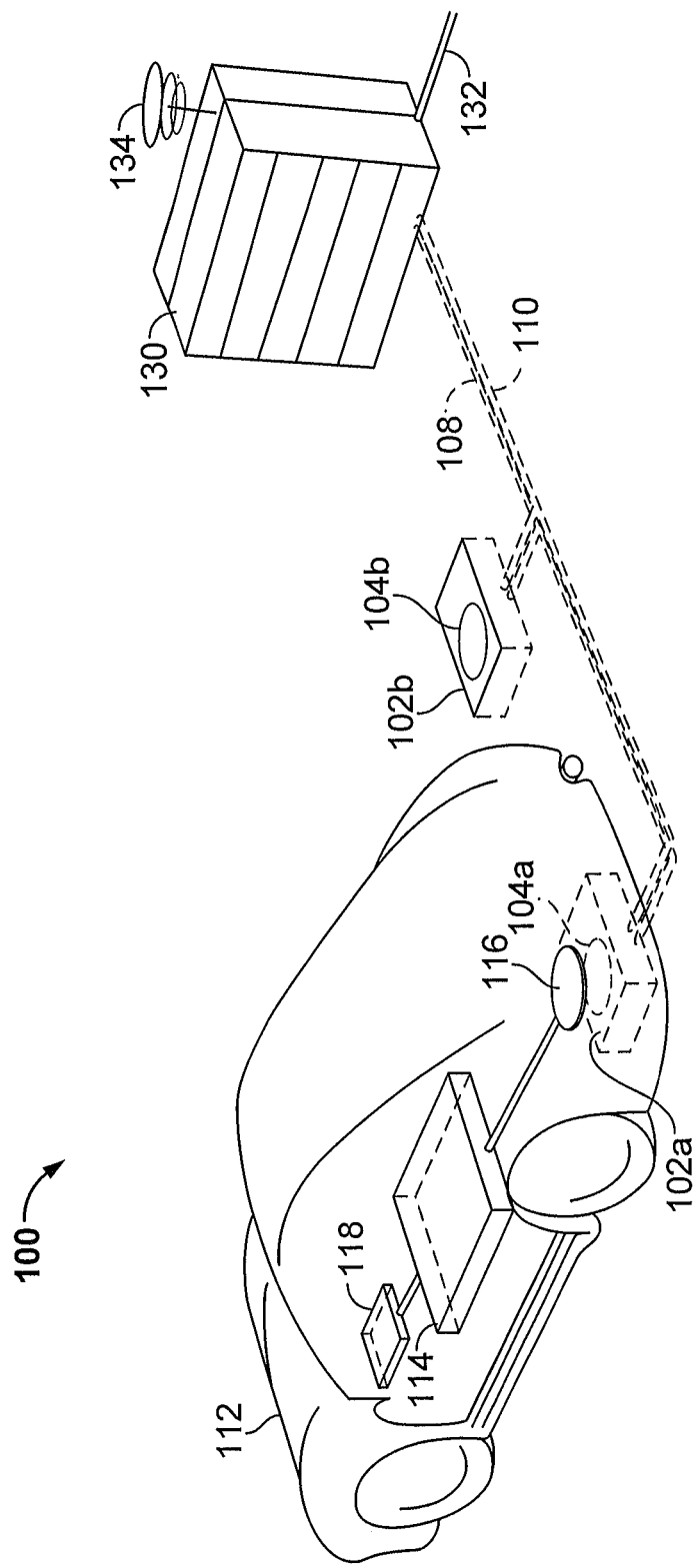
FIG. 1 is a diagram of a wireless power transfer system for charging an electric vehicle, in accordance with some implementations.

FIG. 1 is a diagram of a wireless power transfer system 100 for charging an electric vehicle 112, in accordance with some implementations. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some implementations, a local distribution center 190 may be connected to a power backbone 192 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the magnetic field generated by the base system induction coil 104a.

In some implementations, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $\frac{1}{2\pi}$ of wavelength of the base system induction coil 104a (and vice versa for the electric vehicle induction coil 116) as will be further described below.

Local distribution 1130 may be configured to communicate with external sources (e.g., a power grid) via a communication backhaul 194, and with the base wireless charging system 102a via a communication link 108.

In some implementations the electric vehicle induction coil 116 may be aligned with the base system induction coil 104a and, therefore, disposed within a near-field region simply by the driver positioning the electric vehicle 112 correctly relative to the base system induction coil 104a. In other implementations, the driver may be given visual feedback, auditory feedback, or combinations thereof to determine when the electric vehicle 112 is properly placed for wireless power transfer. In yet other implementations, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other implementations, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
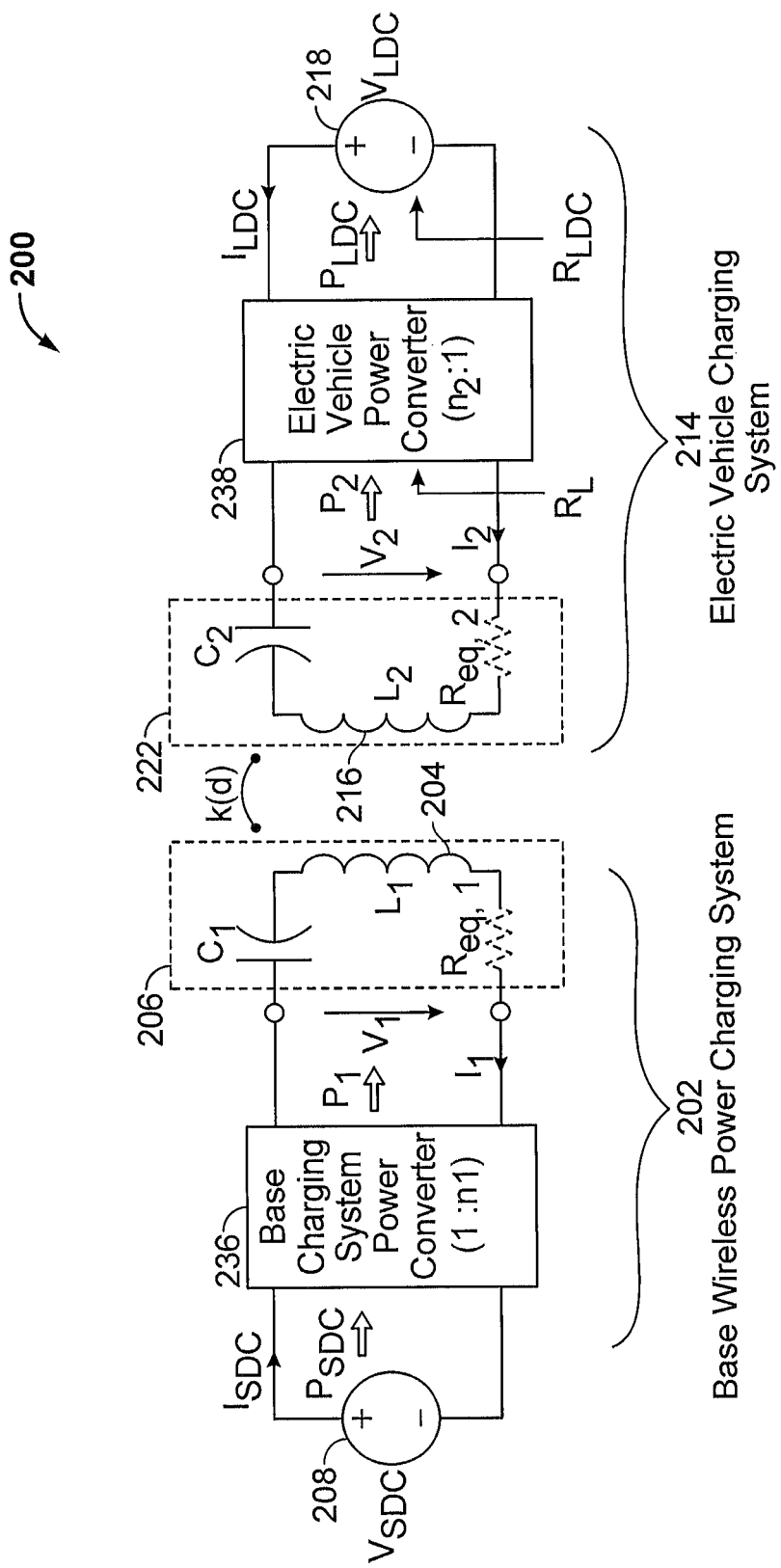
FIG. 2 is a schematic diagram of core components of the wireless power transfer system of FIG. 1.

FIG. 2 is a schematic diagram of core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Implementations described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be coupled with the base system induction coil 204 either in parallel or in series, or may be formed of several reactive elements in any combination of parallel or series topology. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower) and, in some implementations, may be transferred at frequencies including but not limited to 85 kHz.

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. The capacitor $C_2$ may be coupled with the electric vehicle induction coil 204 either in parallel or in series, or may be formed of several reactive elements in any combination of parallel or series topology. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 236 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some implementations, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed implementations may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some implementations, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some implementations, electromagnetic induction coils, such as single and multi-turn loop antennas, are used for both transmitting and receiving since magnetic near field amplitudes in practical implementations tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
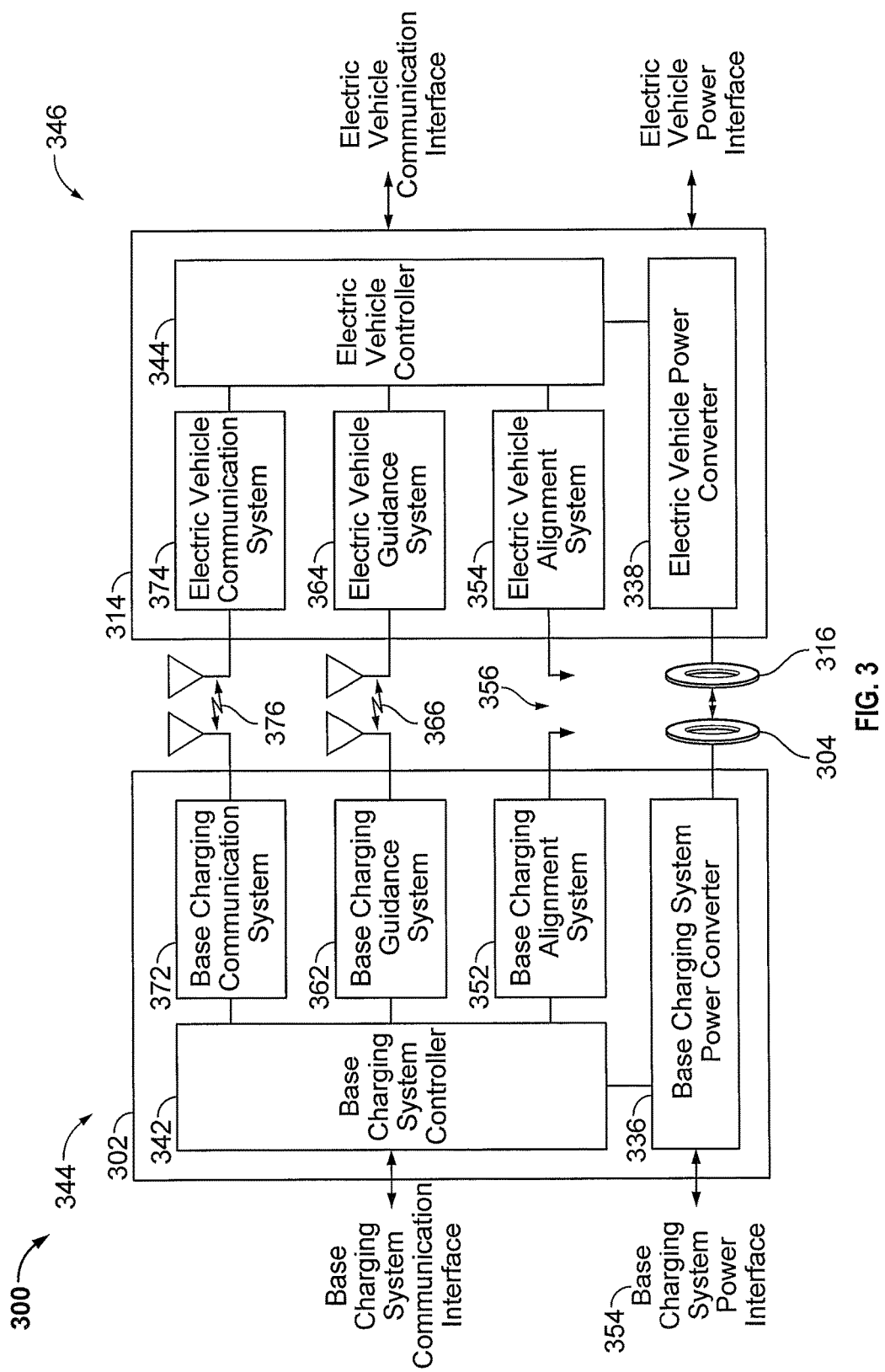
FIG. 3 is another functional block diagram showing core and ancillary components of the wireless power transfer system of FIG. 1.

FIG. 3 is another functional block diagram showing core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 236. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 186. The base charging system power converter 336 may receive AC or DC power from the base charging system power interface 354 to excite the base system induction coil 304 at or near its resonant frequency. The electric vehicle induction coil 236, when in the near field coupling-mode region, may receive energy from the near field coupling mode region to oscillate at or near the resonant frequency. The electric vehicle power converter 338 converts the oscillating signal from the electric vehicle induction coil 236 to a power signal suitable for charging a battery via the electric vehicle power interface.

The base wireless charging system 302 includes a base charging system controller 342 and the electric vehicle charging system 234 includes an electric vehicle controller 344. The base charging system controller 342 may include a base charging system communication interface 212 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 236, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 236. In addition, there may be separate general-purpose communication links (e.g., channels) supported by base charging communication system 372 and electric vehicle communication system 374 for communicating other information between the base wireless power charging system 302 and the electric vehicle charging system 234. This information may include information about electric vehicle characteristics, battery characteristics, charging status, and power capabilities of both the base wireless power charging system 302 and the electric vehicle charging system 234, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 236 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 234 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 234, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 236 may also be configured to act as wireless communication transmitters. Thus, some implementations of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

Moreover, while certain implementations may be used in wireless power transfer systems, it should be appreciated that the various implementations described herein may be applicable to other applications for detecting metal objects in a predetermined space unrelated to systems generating alternating magnetic fields. For example, aspects of implementations described herein may be used in antitheft detectors for detecting metal objects that are removed from a predetermined space, security systems, quality assurance systems, electronic article surveillance, electronic article management, and the like.

With respect to induction charging, depending on the energy transfer rate (power level), operating frequency, size and design of the primary and secondary magnetic structures and the distance between them, the flux density in the air gap at some locations may exceed 0.5 mT and may reach several Millitesla. If an object that includes a certain amount of well conductive material (e.g., metal) is inserted into the space between the primary and secondary structures, eddy currents are generated in this object (Lenz's law) that may lead to power dissipation and subsequent heating effects. This induction heating effect depends on the magnetic flux density, the frequency of the alternating magnetic field, the size, shape, orientation and conductivity of the object's conducting structure. When the object is exposed to the magnetic field for a sufficiently long time, it may heat up to temperatures that may be considered hazardous in regards to self-ignition if the object includes inflammable materials or if it is in direct contact with such materials e.g., a cigarette package including a thin metalized foil, burning a person that may pick-up such a hot object, e.g., a coin or a key, or damaging the plastic enclosure of the primary or secondary structure, e.g., an object melting into the plastic.

A temperature increase may also be expected in objects including ferromagnetic materials that may be substantially non-conducting but exhibiting a pronounced hysteresis effect or in materials that generate both hysteresis and eddy current losses. As such, detecting such objects is beneficial to avoid corresponding harmful consequences. If the object detection system is integrated within a system for providing wireless power, in response to detecting a harmful object, the system may reduce a power level or shut down until measures may be taken to remove the harmful object.

In certain applications of inductive power transfer such as charging of electric vehicles in domestic and public zones, it may be compulsory for reasons of safety of persons and equipment to be able to detect foreign objects that have the potential to heat up to critical temperatures. This may be particularly true in systems where the critical space is open and accessible such that foreign objects may get accidentally or intentionally placed into this space (e.g., sabotage).

Implementations described herein are directed to automatically detecting hazardous foreign objects that may be located in a pre-defined space. In particular, certain implementations are directed to detecting small metallic or ferromagnetic objects (e.g., a coin) located adjacent to a surface of the primary or secondary magnetic structure where magnetic flux density may exceed a particular value (e.g., 0.5 mT).

In accordance with certain implementations, inductive sensing based on magnetic fields may be preferably used since objects that can be sensed via the magnetic field may be objects that are potentially hazardous. Magnetic field sensing may be highly selective on electrically conductive and ferromagnetic objects. At frequencies, e.g., below 20 MHz where a magnetic field may be considered quasi-stationary, there may be virtually no interaction with non-conductive dielectric objects and almost no interaction with badly conducting materials such as water with high salinity, or water-drenched paper, wet wood and foliage, etc.

In some cases, it may be somewhat difficult to detect small objects due to limited range. Smaller objects may be detected, in some cases, if they are in close proximity to a sensor. There may be locations in the space in which objects need to be detected where smaller objects cannot be detected. This is particularly true if, for reasons of mechanical protection and robustness, magnetic field sensors are integrated into the enclosure of an energy transfer pad.

Figure 4:
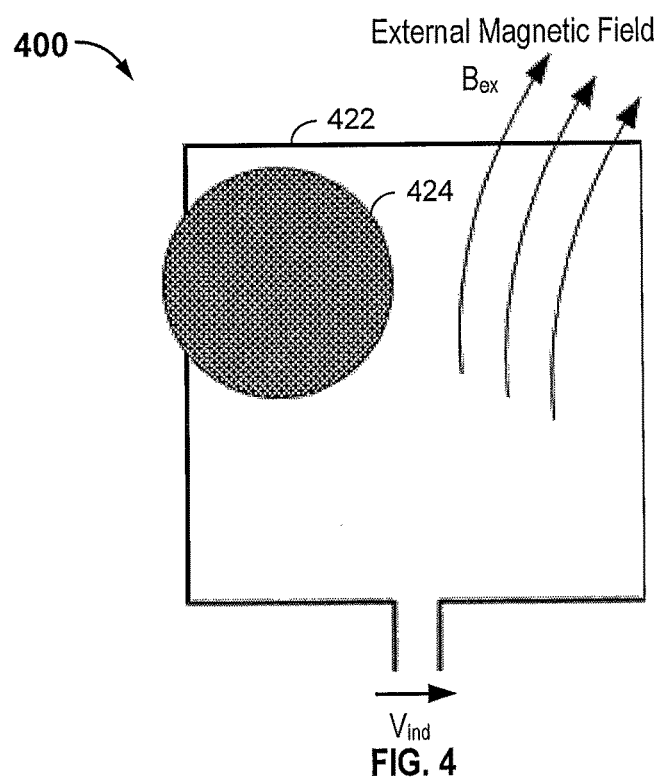
FIGS. 4 and 5 are diagrams of portions of object detection circuitry, in accordance with some implementations.

FIG. 4 is a diagram 400 of a portion of object detection circuitry configured to detect an object 424 via measuring a voltage $V_{ind}$ induced into a sense coil 422, in accordance with some implementations. In accordance with various implementations, the sense coil 422 may be a multi-turn loop (coil) e.g., for increasing sensitivity. Eddy currents in the metal object 424 placed in the proximity of the sense coil 422 change the magnetic flux passing through the sense coil and thus the induced voltage $V_{ind}$. The magnetic field $B_{ex}$ is an external time-varying magnetic field that is generated for inductive energy transfer at an operating frequency, e.g., 85 kHz. For example, the base system induction coil 104a of FIG. 1 may generate the magnetic field $B_{ex}$. The sense coil induced voltage $V_{ind}$, in general, changes in both amplitude and phase depending on the electric and magnetic properties of the object 424.

Figure 5:
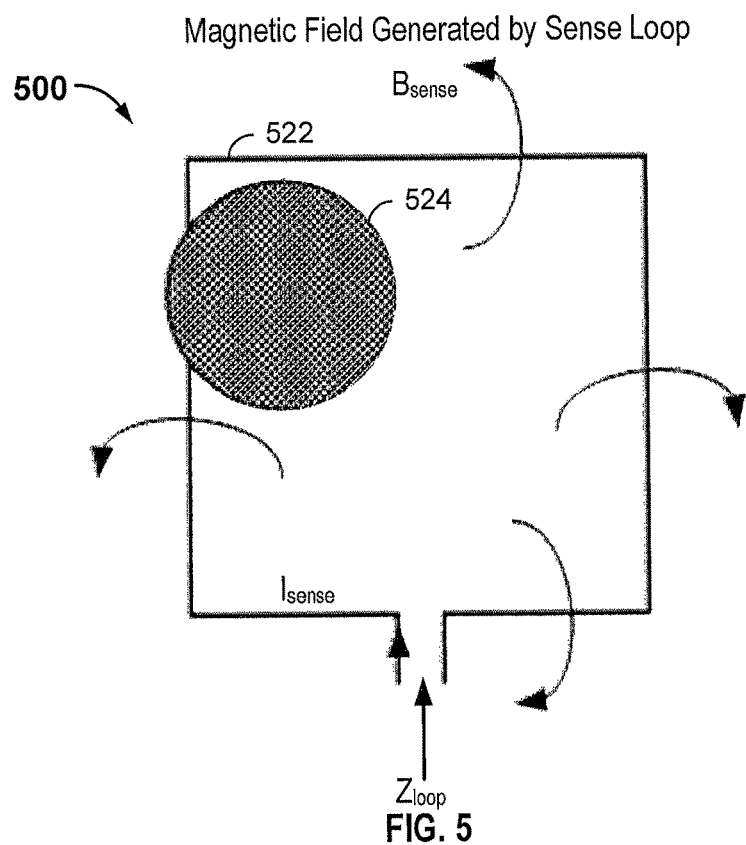

FIG. 5 is another diagram 500 of a portion of object detection circuitry configured to detect an object 524 via measuring a sense coil 522 impedance $Z_{loop}$, in accordance with some implementations. In general, the sense coil 522 may be a multi-turn coil. To measure the sense coil impedance, a small high frequency sense current $I_{sense}$ is injected into the sense coil 522. The metal object 524 in proximity of the sense coil 522 modifies the magnetic flux as generated by the sense coil current $I_{sense}$ and thus modifies the sense coil's inductance and resistance (imaginary and real part of the impedance, respectively). A consequence of this modified sense coil inductance is a commensurate modification of the resonance frequency of a resonant circuit including the sense coil. Implementations exploiting this aspect are described in more detail in connection with FIGS. 22 and 23 below.

A frequency differing from the external magnetic field (e.g., another magnetic field provided for wireless power transfer) may be used for impedance measurements in order to avoid interference from the fundamental or harmonics of the external magnetic field. However, even when the current $I_{sense}$ is injected at a frequency differing from the frequency of the magnetic field provided for wireless power transfer (e.g., 85 kHz), this magnetic field can still cause interference at the wireless power transfer frequency. Accordingly, sense coil geometries that inherently attenuate or filter out induced voltages and currents at or near the wireless power transfer frequency (e.g., 85 kHz) will also inherently increase sensitivity of those sense coils without adjusting the overall dimension of the sense coils. This would also provide a secondary benefit of allowing simpler filter design in downstream components. Moreover, sense coil geometries that provide a more even sensitivity across their entire cross-section as compared to circular or rectangular coil geometries may relax design requirements in downstream processing circuitry.

Figure 6:
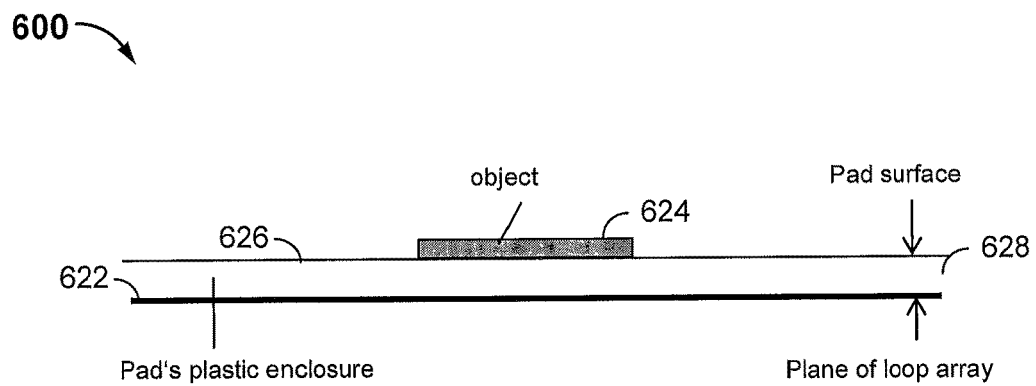
FIG. 6 is a side view of a sense coil configured to detect an object located on or near a magnetic pad, in accordance with some implementations.

FIG. 6 is a side view 600 of a sense coil 622 located on or near a wireless charging pad 626, the sense coil 622 configured to detect an object 624, in accordance with some implementations. The pad 626 has a plastic enclosure 628 and may be configured to hold the sense coil 622 and detect the object 624 placed anywhere on a surface of the pad 626. The charging pad 626 may further include a base system induction coil 104a (not show, see FIG. 1) and associated circuitry as previously described in connection with FIGS. 1-3 and may be configured to detect the object 624 on the pad 626.

The innate sensitivity of a sensor may be defined as the percentage change of the measured quantity (e.g., sense coil induced voltage, sense coil impedance, sense coil resonance frequency) as caused by the presence of the smallest object (reference object) if placed at a position that has the least effect on the change of that measured quantity. The overall sensitivity of a foreign object detector depends on the innate sensitivity of the sensor and on the performance of additional post processing methods that may be part of a downstream processing or evaluation unit.

For objects smaller than the size of the sense coil 622, the innate sensitivity increases with decreasing sense coil size. Decreasing sense coil size implies increasing the number of sense coils required to cover a given area, resulting in increased complexity, costs, and the probability of false alarm and/or failure.

Instead of using a conventional, singular square or rectangular shape, the sense coils 422, 522, 622 of FIGS. 4-6, respectively, may be formed from a conductor having a predetermined shape configured to attenuate currents induced in the conductor by an external time-varying magnetic field (e.g., by the alternating magnetic field utilized by the wireless power transfer system to wirelessly transfer the power) and/or that provides increased sensitivity to metallic objects, for example, a rectangular double-loop, hexagonal, clover leaf, double-D, or quadruple-D shape in accordance with various implementations described below. For example, the predetermined shape of the conductor in each of the sense coils 700, 800, 900, 1000, 1100, 1200 and 1300 described below decreases a difference between a maximum measurable value of an electrical characteristic of the sense coil (e.g., inductance (L), impedance (Z), resonance frequency (F)) when the object is located over at least a portion of the sense coil and the measured value of the electrical characteristic when the object is located substantially over a center of the sense coil, as compared to a substantially rectangular sense coil (e.g., a single rectangular sense coil as previously described in connection with FIGS. 4 and 5). In at least some implementations, means for sensing an electrical characteristic may comprise one or more of the sense coils 700, 800, 900, 1000, 1100 and/or the conductor(s) from which each is formed.

Figure 7:
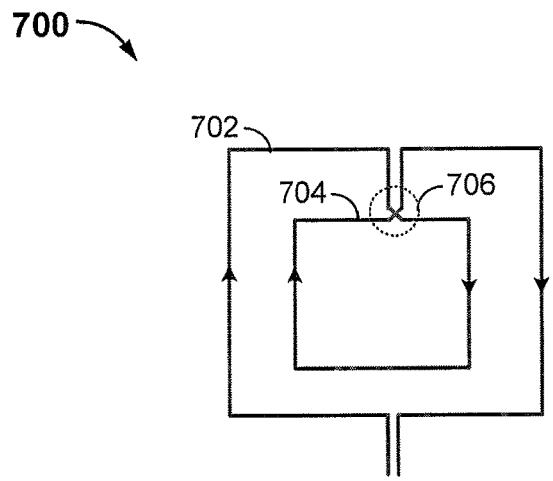
FIG. 7 illustrates a rectangular double loop sense coil configured to detect an object, in accordance with some implementations.

FIG. 7 illustrates a rectangular double loop sense coil 700 configured to detect an object, in accordance with some implementations. The rectangular double loop sense coil 700 geometry may be utilized for one or more of the sense coils 422, 522, 622 as previously described in connection with any of FIGS. 4-6. The rectangular double loop sense coil 700 comprises a conductor wound to form both an outer loop 702 and an inner loop 704. The conductor may cross itself at a transition 706 from the outer loop 702 to the inner loop. As shown by the arrows, a current flowing in the outer loop 702 will flow in a same clockwise or counterclockwise direction as in the inner loop 704 by virtue of the nested relationship between the outer loop 702 and the inner loop 704, and the crossing of the conductor with itself at the transition 706 between them. As will be further described in connection with FIG. 13, the rectangular double loop sense coil 700 may provide increased sensitivity for sensing a presence of a metallic object located at a center of the outer and inner loops 702, 704, as compared to a conventional square or rectangular sense coil having comparable outer dimensions and/or cross sectional area.

Figure 8:
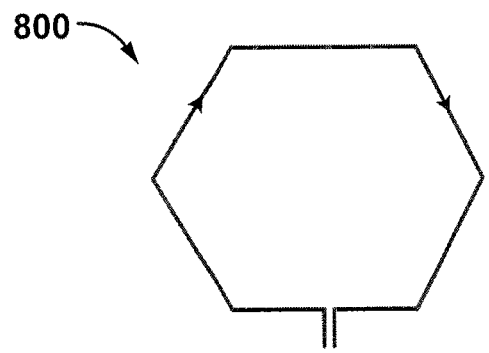
FIG. 8 illustrates a hexagonal sense coil configured to detect an object, in accordance with some implementations.

FIG. 8 illustrates a hexagonal sense coil 800 configured to detect an object, in accordance with some implementations. The hexagonal sense coil 800 geometry may be utilized for one or more of the sense coils 422, 522, 622 as previously described in connection with any of FIGS. 4-6. The hexagonal sense coil 800 may comprise a conductor wound or disposed to define each of six sides of a hexagonal shape for the sense coil 800. In some implementations, each of the sides of the hexagonal sense coil 800 may be the same length, having the same bending angle at transitions between adjacent sides. In some other implementations, the sides of the hexagonal sense coil 800 may have different lengths such that all six sides do not have the same length. In such implementations, the bending angle at transitions between adjacent sides may be either all be the same, or may be different from one another, depending on the specific overall shape of the hexagonal sense coil 800. As will be further described in connection with FIG. 14, the hexagonal sense coil 800 may provide increased sensitivity for sensing a presence of a metallic object located at a center of the hexagonal sense coil 800, as compared to a conventional square or rectangular sense coil having comparable outer dimensions and/or cross sectional area.

Figure 9:
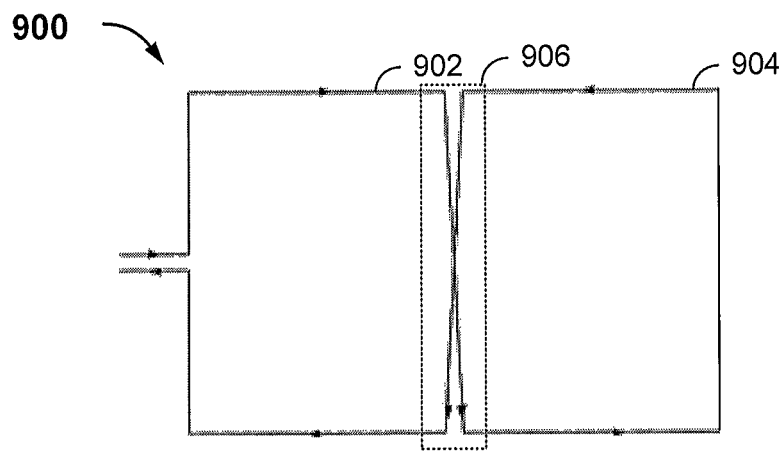
FIG. 9 illustrates a double-D sense coil configured to detect an object, in accordance with some implementations.

FIG. 9 illustrates a double-D sense coil 900 configured to detect an object, in accordance with some implementations. The double-D sense coil 900 geometry may be utilized for one or more of the sense coils 422, 522, 622 as previously described in connection with any of FIGS. 4-6. The double-D sense coil 900 comprises a conductor wound to form both a first loop 902 and a second loop 904 disposed adjacent to the first loop 902. The conductor may cross itself at a transition 906 between the first loop 902 and the second loop 904. As shown by the arrows, a current flowing in the first loop 902 will flow in an opposite clockwise or counterclockwise direction as in the second loop 904 by virtue of the crossing of the conductor with itself at the transition 906 between the first loop 902 and the second loop 904. As will be further described in connection with FIG. 16, the double-D sense coil 900 may provide increased sensitivity for sensing a presence of a metallic object located at a center of the double-D sense coil 900, as compared to a conventional square or rectangular sense coil having comparable outer dimensions and/or cross sectional area. In addition, the double-D sense coil 900 may inherently attenuate, filter, or filter out induced noise or interference at the operating frequency of the wireless power transfer system (e.g., 85 kHz) due at least in part to the opposite direction of circulation of any currents that would be induced within the loops 902 and 904 by the wireless power transfer system's alternating magnetic field.

Figure 10:
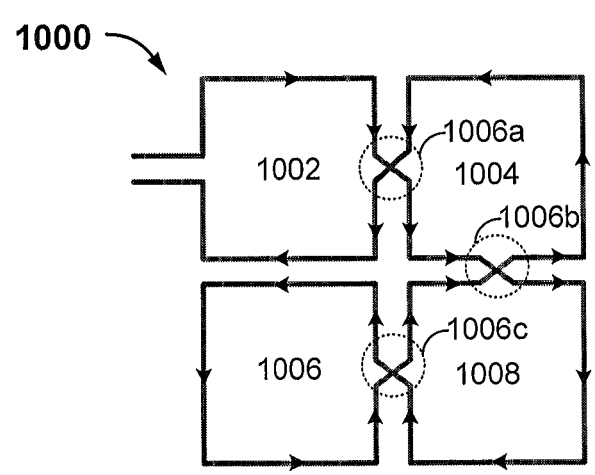
FIG. 10 illustrates a quadruple-D sense coil configured to detect an object, in accordance with some implementations.

FIG. 10 illustrates a quadruple-D sense coil 1000 configured to detect an object, in accordance with some implementations. The quadruple-D sense coil 1000 geometry may be utilized for one or more of the sense coils 422, 522, 622 as previously described in connection with any of FIGS. 4-6. The quadruple-D sense coil 1000 comprises a conductor wound to form each of a first loop 1002, a second loop 1004, a third loop 1006, and a fourth loop 1008. The conductor may cross itself at a first transition 1006a between the first loop 1002 and the second loop 1004, at a second transition 1006b between the second loop 1004 and the third loop 1006, and at a third transition 1006c between the third loop 1006 and the fourth loop 1004. As shown by the arrows, a current will flow in alternating clockwise and counterclockwise directions for the first loop 1002, the second loop 1004, the third loop 1006, and the fourth loop 1008 by virtue of the crossing of the conductor with itself at each of the above-mentioned transitions between loops. As will be further described in connection with FIG. 17, the quadruple-D sense coil 1000 may provide increased sensitivity for sensing a presence of a metallic object located at a center of the quadruple-D sense coil 1000, as compared to a conventional square or rectangular sense coil having comparable outer dimensions and/or cross sectional area. In addition, the double-D sense coil 1000 may inherently attenuate, filter, or filter out induced noise or interference at the operating frequency of the wireless power transfer system (e.g., 85 kHz) due at least in part to the opposite direction of circulation of any currents that would be induced within the loops 1002, 1004, 1006 and 1008 by the wireless power transfer system's alternating magnetic field.

Figure 11:
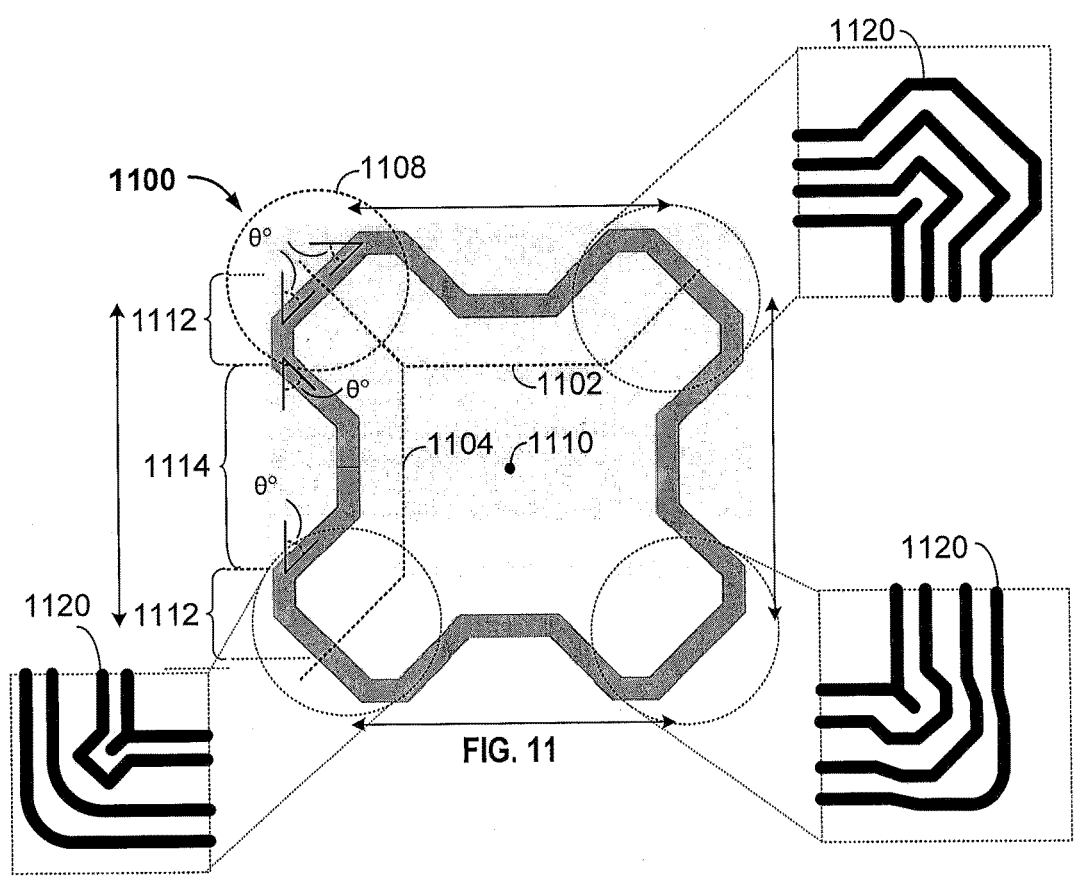
FIG. 11 illustrates a clover leaf-shaped sense coil configured to detect an object, in accordance with some implementations.

FIG. 11 illustrates a clover leaf-shaped sense coil 1100 configured to detect an object, in accordance with some implementations. The coil comprises a plurality of sides 1102, 1104, etc. At each corner (e.g., corner 1108) of corresponding sides (e.g., sides 1104 and 1102) of the clover leaf-shaped sense coil 1100, a conductor is bent at an acute angle θ (e.g., a substantially 45° angle) with respect to a direction of extension of each of the corresponding sides 1102, 1104 to form substantially rounded corners 1108. Such directions of extension are shown by the double headed arrows. In addition, at a middle portion 1114 of each of the sides 1102, 1104, the conductor 1120 is bent at an acute angle θ (e.g., a substantially 45° angle) with respect to the direction of extension of the side at each end of the middle portion 1114. Thus, the conductor 1120 bows toward a center 1110 of the sense coil 1100 as the conductor extends from an outer portion 1112 of the respective side of the sense coil 1100 toward a middle portion 1114 of the respective side of the sense coil 1100. Accordingly, the middle portions 1114 of two opposite sides of the transmit sense coil 1100 may be closer to one another (as well as to the center 1110 of the transmit sense coil 1100) than are the outer portions 1112 of the two opposite sides of the transmit sense coil 1100. Though 45° is described, any acute angle θ may be utilized (e.g., 0°<θ<90°) which results in at least the middle portion 1114 that bows toward the center 1110 of the sense coil 1100. Moreover, although the sense coil 1100 is shown to have substantially the same width and length, either one of the width or the length may be longer than the other. As will be further described in connection with FIG. 17, the clover leaf-shaped sense coil 1100 may provide increased sensitivity for sensing a presence of a metallic object located at the center 1110 of the clover leaf-shaped sense coil 1100, as compared to a conventional square or rectangular sense coil having comparable outer dimensions and/or cross sectional area.

In other implementations, as shown in more detail at the lower right of FIG. 11, rather than all turns or windings of the conductor 1120 bowing toward the center 1110 of the sense coil 1100 to a substantially equal degree, the successive turns or windings of the conductor 1120 may bow toward the center 1110 of the sense coil 1100 to an increasing extent from an outermost winding to an innermost winding of the sense coil 1100 (e.g., the spacing between the successive windings from an outermost winding to an innermost winding increases). Although only one corner of the sense coil 1100 is shown as such, in such implementations, each corner of the sense coil 1100 may have the same construction.

In yet other implementations, as shown in more detail at the lower left of FIG. 11, rather than all turns or windings of the conductor 1120 bowing toward the center 1110 of the sense coil 1100, one or more windings may not bow toward the center 1110 (e.g., may extend in a substantially straight line along an entire side of the coil 1100), while one or more other windings may bow toward the center 1110 as previously described. Although only one corner of the sense coil 1100 is shown as such, in such implementations, each corner of the sense coil 1100 may have the same construction. Distributing turns or windings in the same coil between the cloverleaf winding pattern and the conventional winding pattern may further flatten the sensitivity range across all offsets of (or increase the acceptable offset range of) a metallic object located in the vicinity or over the sense coil 1100. Although 4 turns or windings are shown in each of the more detailed portions of FIG. 11, any number of windings may be contemplated, for example, 1 to 20.

Figure 12:
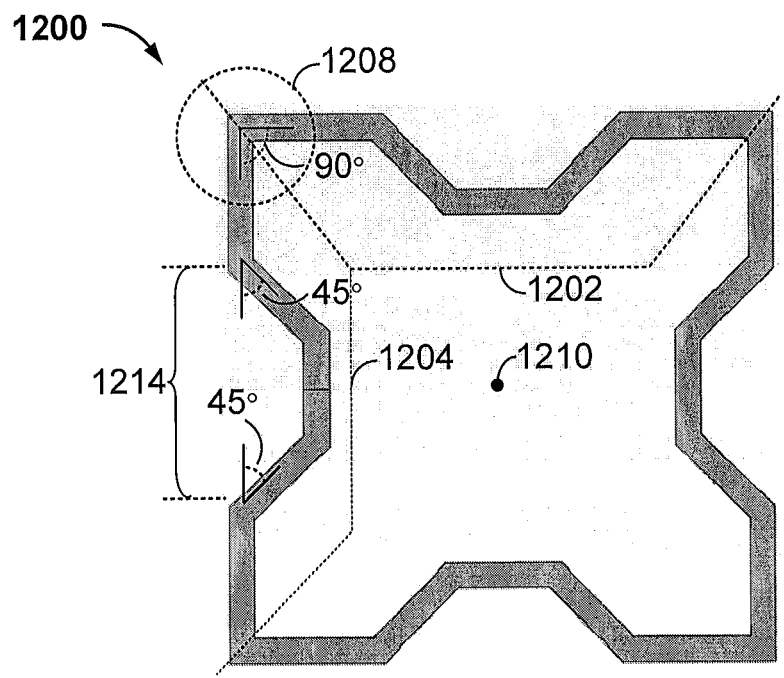
FIG. 12 illustrates an alternative clover leaf-shaped sense coil configured to detect an object, in accordance with some implementations.

FIG. 12 is another alternatively designed "butterfly" or "clover leaf" shaped sense coil 1200, in accordance with some implementations. The coil 1200 may be substantially the same as the coil 1100 with the exception that at each corner (e.g., corner 1208) of corresponding sides (e.g., the sides 1204 and 1202), the conductor is bent at a right angle (e.g., a substantially 90° angle) with respect to the direction of extension of each of the corresponding sides 1204, 1202 to form substantially square corners. Like the coil 1100 of FIG. 11, at a middle portion 1214 of each of the sides, the conductor is bent at an acute angle (e.g., a substantially 45° angle) with respect to the direction of extension of the side at each end of the middle portion 1214. As previously stated, though 45° is expressly labeled, any acute angle may be utilized that results in the middle portion 1214 bowing toward the center 1210 of the coil 1200. Moreover, although the coil 1200 is shown to have substantially the same width and length, either one of the width or the length may be longer than the other.

Figure 13:
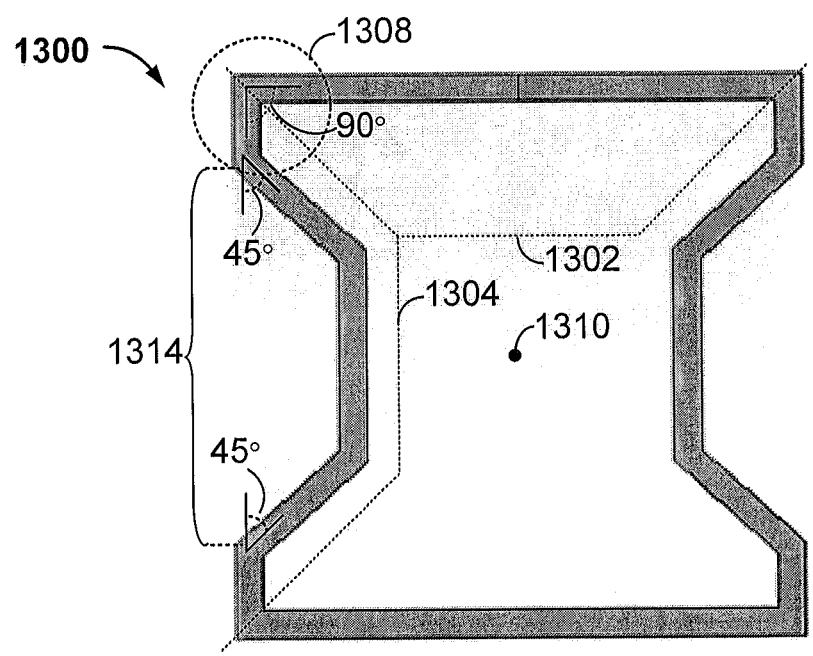
FIG. 13 illustrates yet another alternative clover leaf-shaped sense coil configured to detect an object, in accordance with some implementations.

In some implementations, less than all of the sides of the coil may bow toward a center of the coil. This may be useful where substantially uniform magnetic coupling factors and profiles are desired in only one dimension. FIG. 13 is another alternatively designed "butterfly" or "clover leaf" shaped sense coil 1300, in accordance with some implementations. The coil 1300 may be substantially the same as the coil 1200 with the exception that the conductor on less than all of the sides of the coil bows toward a center 1310 of the coil 1300. Like the coil 1200 of FIG. 12, at each corner (e.g., corner 1308) of corresponding sides (e.g., the sides 1304 and 1302), the conductor is bent at a right angle (e.g., a substantially 90° angle) with respect to the direction of extension of each of the corresponding sides 1304, 1302 to form substantially square corners. At a middle portion 1314 of some of the sides, the conductor is bent at an acute angle (e.g., a substantially 45° angle) with respect to the direction of extension of the side at each end of the middle portion 1314. Though 45° is expressly labeled, any acute angle may be utilized that results in the middle portion 1314 bowing toward the center 1310 of the coil 1300. Since less than all of the sides 1302, 1304 of the coil 1300 bow toward the center 1310 of the coil 1300, for at least one side 1302 of the plurality of sides of the coil 1300, the conductor extends in a substantially straight line along the entire side 1302. Moreover, although the transmit coil 1300 is shown to have substantially the same width and length, either one of the width or the length may be longer than the other.

FIGS. 14-19 show detection sensitivity simulations performed utilizing a 5 Euro cent coin having a diameter of 21.25 mm, a thickness of 1.67 mm, and a vertical gap between the coin and the respectively-shaped sense coil of 3 mm as the metallic object. As will be shown in connection with any of FIGS. 14-19, the use of any of the sense coil geometries of FIGS. 7-13 provides a higher, more uniform sensitivity over the cross section of the respective sense coils without substantially decreasing peaks in that sensitivity, as compared to the conventional square or rectangular sense coil previously described in connection with FIGS. 4 and 5. Thus, sense coil dimensions may either remain the same or be increased as compared to a conventional square or rectangular sense coil while increasing or maintaining, respectively, the associated sensitivity.

Figure 14:
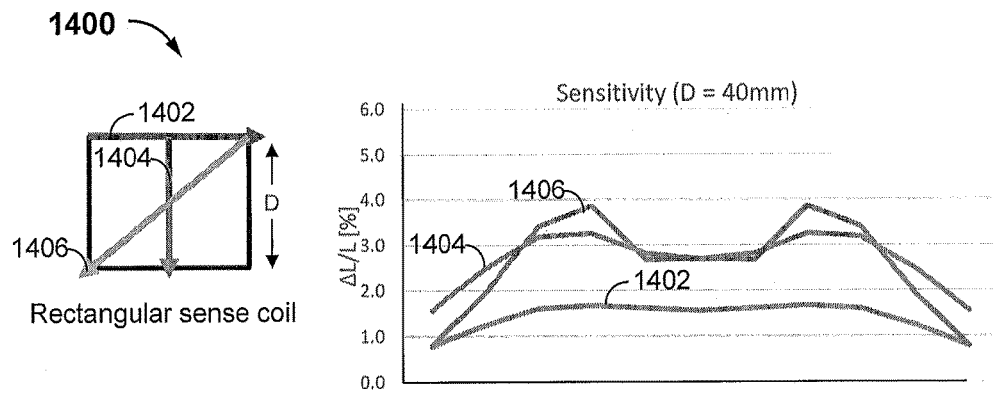
FIG. 14 is a graph illustrating a change in equivalent inductance of a conventional rectangular sense coil in the presence of a metallic object, in accordance with some implementations.

FIG. 14 is a graph 1400 illustrating a change in equivalent inductance of a conventional rectangular sense coil in the presence of a metallic object, in accordance with some implementations. The graph 1400 includes three traces 1402, 1404, 1406. Each of the three traces 1402, 1404, 1406 illustrates a relative percent change ($\Delta L$) in the equivalent inductance (L) of the rectangular sense coil having a diameter D (e.g., 40 mm) as a metallic object is moved along a path shown by each respectively labelled arrow at the left of the graph 1400. For example, the trace 1402 shows the relative percent change ($\Delta L$) in the equivalent inductance (L) of the rectangular sense coil as the metallic object is moved from left to right along a horizontal edge of the rectangular sense coil. The trace 1404 shows the relative percent change ($\Delta L$) in the equivalent inductance (L) of the rectangular sense coil as the metallic object is moved from top to bottom substantially along a center line of the rectangular sense coil. The trace 1406 shows the relative percent change ($\Delta L$) in the equivalent inductance (L) of the rectangular sense coil as the metallic object is moved substantially along a diagonal of the rectangular sense coil. The percentage changes ($\Delta L$) are with respect to an equivalent inductance (L) of the rectangular sense coil when no metallic object is in proximity. In some implementations, an array of closely packed conventional rectangular sense coils may provide approximately 96.7% sensing coverage over the defined area of the array with a minimum sensitivity threshold of $\Delta L/L \geq 1\%$.

Figure 15:
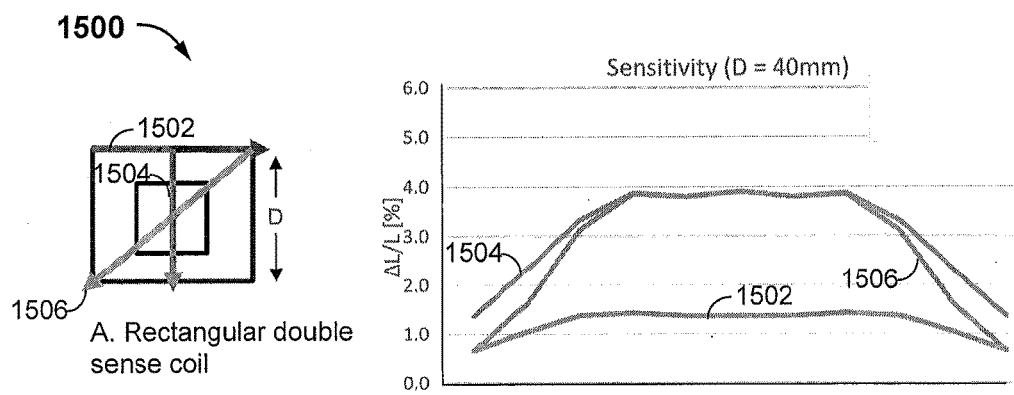
FIG. 15 is a graph illustrating a change in equivalent inductance of a rectangular double loop sense coil in the presence of a metallic object, in accordance with some implementations.

FIG. 15 is a graph 1500 illustrating a change in equivalent inductance of a rectangular double loop sense coil in the presence of a metallic object, in accordance with some implementations. The graph 1500 includes three traces 1502, 1504, 1506. Each of the three traces 1502, 1504, 1506 illustrates a relative percent change ($\Delta L$) in the equivalent inductance (L) of the rectangular double loop sense coil having a diameter D (e.g., 40 mm) as a metallic object is moved along a path shown by each respectively labelled arrow at the left of the graph 1500. For example, the trace 1502 shows the relative percent change ($\Delta L$) in the equivalent inductance (L) of the rectangular double loop sense coil as the metallic object is moved from left to right along a horizontal edge of the rectangular double loop sense coil. The trace 1504 shows the relative percent change ($\Delta L$) in the equivalent inductance (L) of the rectangular double loop sense coil as the metallic object is moved from top to bottom substantially along a center line of the rectangular double loop sense coil. The trace 1506 shows the relative percent change ($\Delta L$) in the equivalent inductance (L) of the rectangular double loop sense coil as the metallic object is moved substantially along a diagonal of the rectangular double loop sense coil. The percentage changes ($\Delta L$) are with respect to an equivalent inductance (L) of the rectangular double loop sense coil when no metallic object is in proximity. In some implementations, an array of closely packed rectangular double loop sense coils may provide approximately 96.7% sensing coverage over the defined area of the array with a minimum sensitivity threshold of $\Delta L/L \geq 1\%$.

Figure 16:
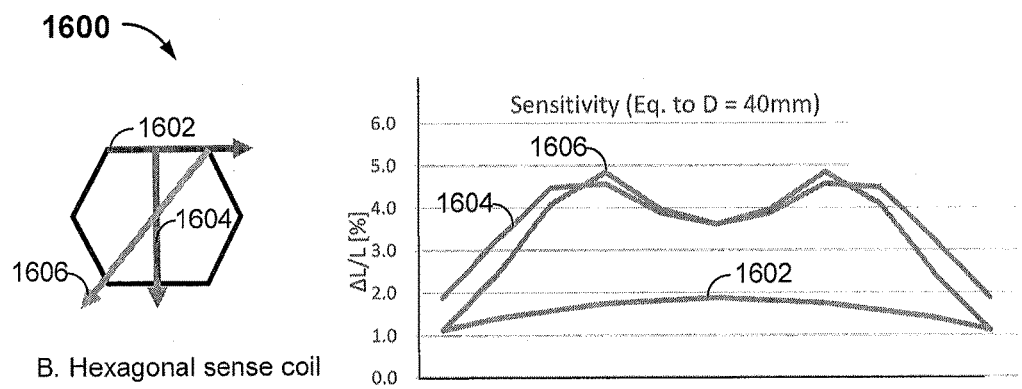
FIG. 16 is a graph illustrating a change in equivalent inductance of a hexagonal sense coil in the presence of a metallic object, in accordance with some implementations.

FIG. 16 is a graph 1600 illustrating a change in equivalent inductance of a hexagonal sense coil in the presence of a metallic object, in accordance with some implementations. The graph 1600 includes three traces 1602, 1604, 1606. Each of the three traces 1602, 1604, 1606 illustrates a relative percent change ($\Delta L$) in the equivalent inductance (L) of the hexagonal sense coil having a diameter D (e.g., 40 mm) as a metallic object is moved along a path shown by each respectively labelled arrow at the left of the graph 1600. For example, the trace 1602 shows the relative percent change ($\Delta L$) in the equivalent inductance (L) of the hexagonal sense coil as the metallic object is moved from left to right along a horizontal edge of the hexagonal sense coil. The trace 1604 shows the relative percent change ($\Delta L$) in the equivalent inductance (L) of the hexagonal sense coil as the metallic object is moved from top to bottom substantially along a center line of the hexagonal sense coil. The trace 1606 shows the relative percent change ($\Delta L$) in the equivalent inductance (L) of the hexagonal sense coil as the metallic object is moved substantially along a diagonal of the hexagonal sense coil. The percentage changes (ΔL) are with respect to an equivalent inductance (L) of the hexagonal sense coil when no metallic object is in proximity. In some implementations, an array of closely packed hexagonal sense coils may provide approximately 100.0% sensing coverage over the defined area of the array with a minimum sensitivity threshold of ΔL/L≥1%. In some implementations, the array itself may have a substantially circular cross section.

Figure 17:
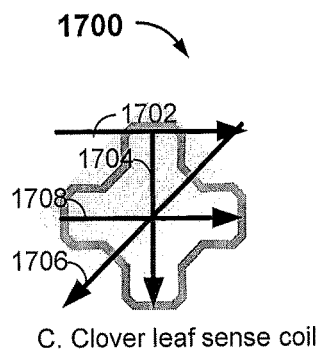
FIG. 17 is a graph illustrating a change in equivalent inductance of a clover leaf-shaped sense coil in the presence of a metallic object, in accordance with some implementations.
Figure 17:
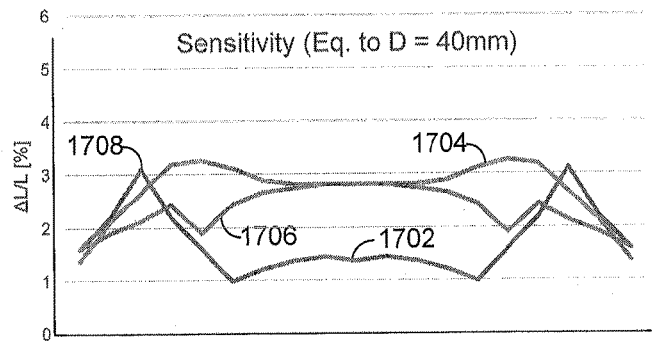

FIG. 17 is a graph 1700 illustrating a change in equivalent inductance of a clover leaf-shaped sense coil in the presence of a metallic object, in accordance with some implementations. Each of the four traces 1702, 1704, 1706, 1708 illustrates a relative percent change (ΔL) in the equivalent inductance (L) of the clover leaf-shaped sense coil having diameter D (e.g., 40 mm) as a metallic object is moved along a path shown by each respectively labelled arrow at the left of the graph 1700. For example, the trace 1702 shows the relative percent change (ΔL) in the equivalent inductance (L) of the clover leaf-shaped sense coil as the metallic object is moved from left to right along a horizontal edge of the clover leaf-shaped sense coil. The trace 1704 shows the relative percent change (ΔL) in the equivalent inductance (L) of the clover leaf-shaped sense coil as the metallic object is moved from top to bottom substantially along a center line of the clover leaf-shaped sense coil. The trace 1706 shows the relative percent change (ΔL) in the equivalent inductance (L) of the clover leaf-shaped sense coil as the metallic object is moved substantially along a diagonal of the clover leaf-shaped sense coil. The trace 1708 shows the relative percent change (ΔL) in the equivalent inductance (L) of the clover leaf-shaped sense coil as the metallic object is moved from left to right substantially along another center line of the clover leaf-shaped sense coil. The percentage changes (ΔL) are with respect to an equivalent inductance (L) of the clover leaf-shaped sense coil when no metallic object is in proximity. In some implementations, an array of closely packed clover leaf-shaped sense coils may provide approximately 98.2% sensing coverage over the defined area of the array with a minimum sensitivity threshold of ΔL/L≥1%.

Figure 18:
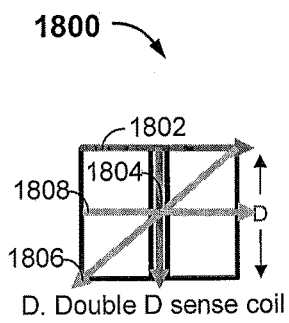
FIG. 18 is a graph illustrating a change in equivalent inductance of a double-D sense coil in the presence of a metallic object, in accordance with some implementations.
Figure 18:
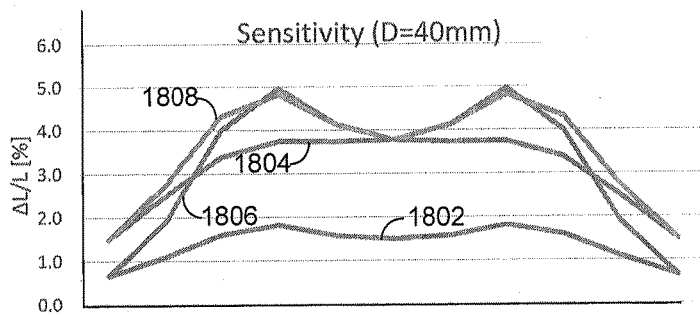

FIG. 18 is a graph 1800 illustrating a change in equivalent inductance of a double-D sense coil in the presence of a metallic object, in accordance with some implementations. The graph 1800 includes four traces 1802, 1804, 1806, 1808. Each of the four traces 1802, 1804, 1806, 1808 illustrates a relative percent change (ΔL) in the equivalent inductance (L) of the double-D sense coil having diameter D (e.g., 40 mm) as a metallic object is moved along a path shown by each respectively labelled arrow at the left of the graph 1800. For example, the trace 1802 shows the relative percent change (ΔL) in the equivalent inductance (L) of the double-D sense coil as the metallic object is moved from left to right along a horizontal edge of the double-D sense coil. The trace 1804 shows the relative percent change (ΔL) in the equivalent inductance (L) of the double-D sense coil as the metallic object is moved from top to bottom substantially along a center line of the double-D sense coil. The trace 1806 shows the relative percent change (ΔL) in the equivalent inductance (L) of the double-D sense coil as the metallic object is moved substantially along a diagonal of the double-D sense coil. The trace 1808 shows the relative percent change (ΔL) in the equivalent inductance (L) of the double-D sense coil as the metallic object is moved from left to right substantially along another center line of the double-D sense coil. The percentage changes (ΔL) are with respect to an equivalent inductance (L) of the double-D sense coil when no metallic object is in proximity. In some implementations, an array of closely packed double-D sense coils may provide approximately 96.7% sensing coverage over the defined area of the array with a minimum sensitivity threshold of ΔL/L≥1%.

Figure 19:
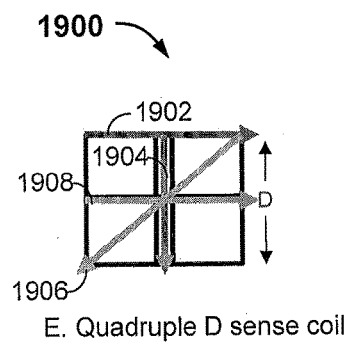
FIG. 19 is a graph illustrating a change in equivalent inductance of a quadruple-D sense coil in the presence of a metallic object, in accordance with some implementations.
Figure 19:
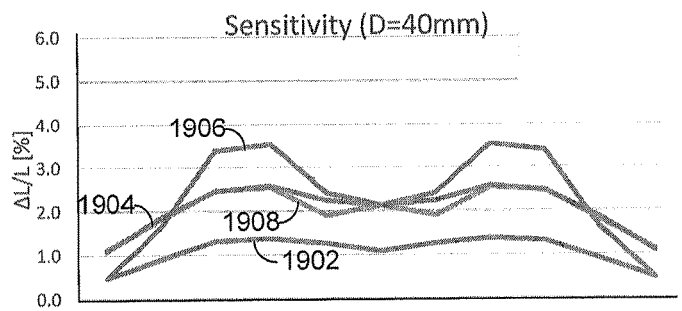

FIG. 19 is a graph 1900 illustrating a change in equivalent inductance of a quadruple-D sense coil in the presence of a metallic object, in accordance with some implementations. The graph 1900 includes four traces 1902, 1904, 1906, 1908. Each of the four traces 1902, 1904, 1906, 1908 illustrates a relative percent change (ΔL) in the equivalent inductance (L) of the quadruple-D sense coil having diameter D (e.g., 40 mm) as a metallic object is moved along a path shown by each respectively labelled arrow at the left of the graph 1900. For example, the trace 1902 shows the relative percent change (ΔL) in the equivalent inductance (L) of the quadruple-D sense coil as the metallic object is moved from left to right along a horizontal edge of the quadruple-D sense coil. The trace 1904 shows the relative percent change (ΔL) in the equivalent inductance (L) of the quadruple-D sense coil as the metallic object is moved from top to bottom substantially along a center line of the quadruple-D sense coil. The trace 1906 shows the relative percent change (ΔL) in the equivalent inductance (L) of the quadruple-D sense coil as the metallic object is moved substantially along a diagonal of the quadruple-D sense coil. The trace 1908 shows the relative percent change (ΔL) in the equivalent inductance (L) of the quadruple-D sense coil as the metallic object is moved from left to right substantially along another center line of the quadruple-D sense coil. The percentage changes (ΔL) are with respect to an equivalent inductance (L) of the quadruple-D sense coil when no metallic object is in proximity. In some implementations, an array of closely packed double-D loop sense coils may provide approximately 96.7% sensing coverage over the defined area of the array with a minimum sensitivity threshold of ΔL/L≥1%.

Figure 20:
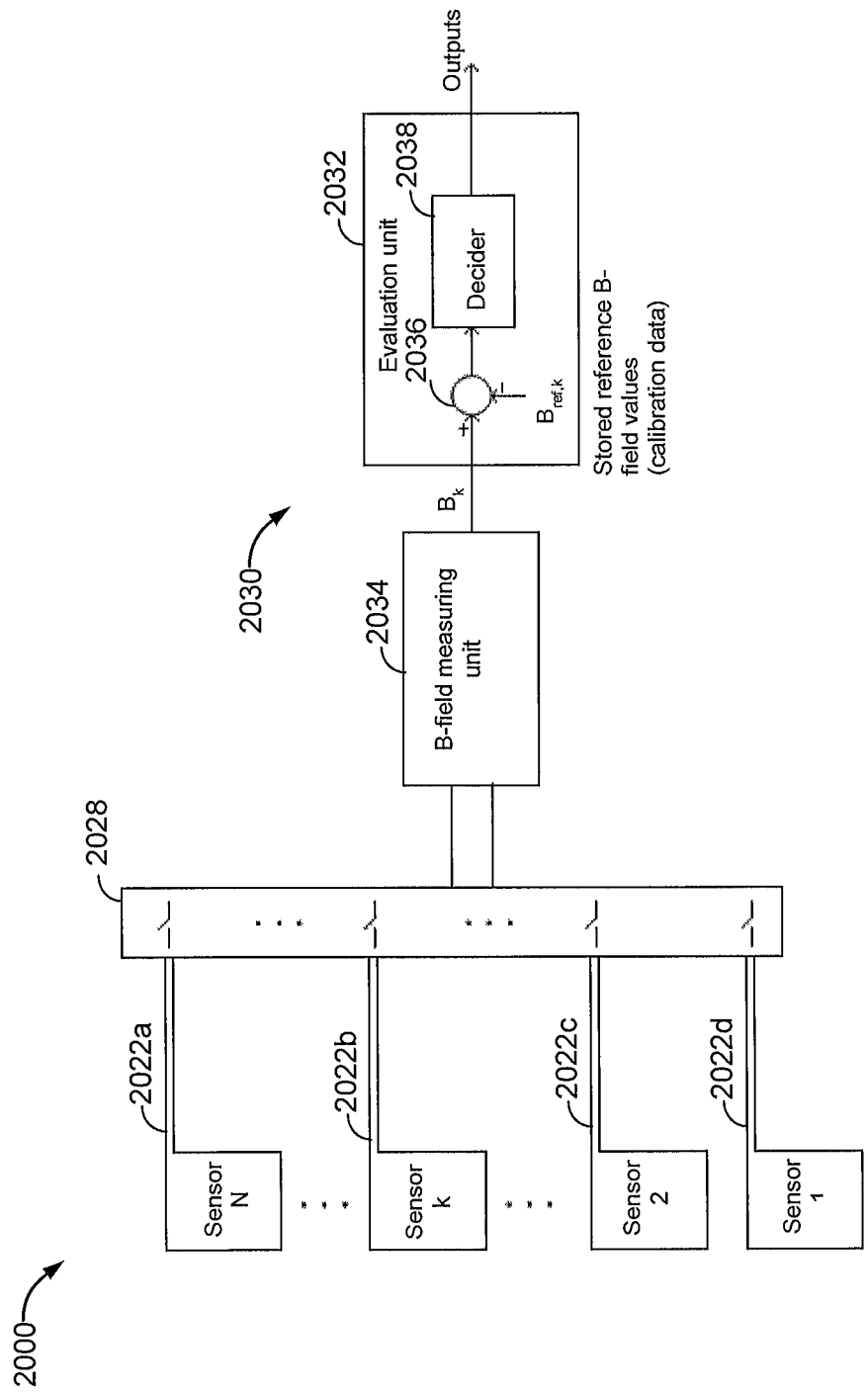
FIG. 20 is a functional block diagram of a circuit configured to detect an object based on magnetic field sensing, in accordance with some implementations.

FIG. 20 is a functional block diagram of a circuit 2000 configured to detect an object 624 based on magnetic field $B_k$ sensing, in accordance with some implementations. This section describes some implementations for enhancing performance of a metal object detector that is based on sensing a magnetic field (flux density) as generated by a magnetic structure, e.g., the charging pad 626, over a predetermined area. The charging pad 626 may correspond to a charging system as described above with reference to FIGS. 1-3. The circuit 2000 may include several sense coils 2022a, 2022b, 2022c, and 2022d (referred to herein after collectively as sense coils 2022). The sense coils 2022 may form a part of an array of densely packed sense coils that cover an area to be protected in which metal objects may be detected. As described above, detecting an object 624 may be accomplished by measuring the voltage induced into the sense coils 2022. The circuit 2000 includes a detection circuit 2030 that selectively couples to each of the sense coils 2022 via a multiplexer 2028. The detection circuit 2030 includes a magnetic field measuring unit 2034 configured to measure a magnetic field strength at each of the sense coils 2022. A measured value of the magnetic field strength $B_k$ at a particular sense coil is provided to an evaluation unit 2032 including a comparator 2036 and a decider 2038. The comparator 2036 receives the measured magnetic field value $B_k$ and compares the value $B_k$ with a reference magnetic field value $B_{ref,k}$. The reference magnetic field value $B_{ref,k}$ may correspond to an expected value of the magnetic field $B_k$ for a sense coil 2022a in the absence of any object 624. Based on the output of the comparator 2036, the decider 2038 is configured to determine whether an object is present. For example, the decider 2038 may determine that the difference between the measured value $B_k$ and the reference value $B_{ref,k}$ is greater than a threshold and output a signal that an object is detected in response. The decider 2038 may further compensate the output of the comparator 2036 based on known operating characteristics. Thus, means for detecting the presence of an object may comprise one or more components of the detection circuit 2030 or of any of the detection circuits 2130, 2230, 2330 and 2430 as will be described below.

Implementations according to the circuit of FIG. 20 may be useful in use cases where there is a magnetic field on the base pad surface that is subject to temporal changes (e.g., perturbations, distortions) due to the presence of the vehicle pick-up pad and the vehicle's metallic underbody structure that may be at different vertical and horizontal positions (e.g., different alignment offsets). Evaluation may be based on a least mean square error criterion and may be implemented into the evaluation unit 2032. Other more sophisticated methods using other error metrics and iterative processes e.g., RANSAC (Random Sample Consensus method) may also be used.

A process for detecting an object may be formulated as follows:

Find a metal object 624 that exerts little distortion, perturbation, or disturbance of the magnetic field pattern as present on the pad 626 surface. This field pattern may exhibit strong variations in flux density due to an inhomogeneous magnetic structure (e.g., coil, ferrites) and additionally due to temporary variations (e.g., distortions) due to the different positions of the vehicle pad and the vehicle's metallic underbody structure. For example, there may be significant field distortion and other impact from pad alignment offset.

Figure 21:
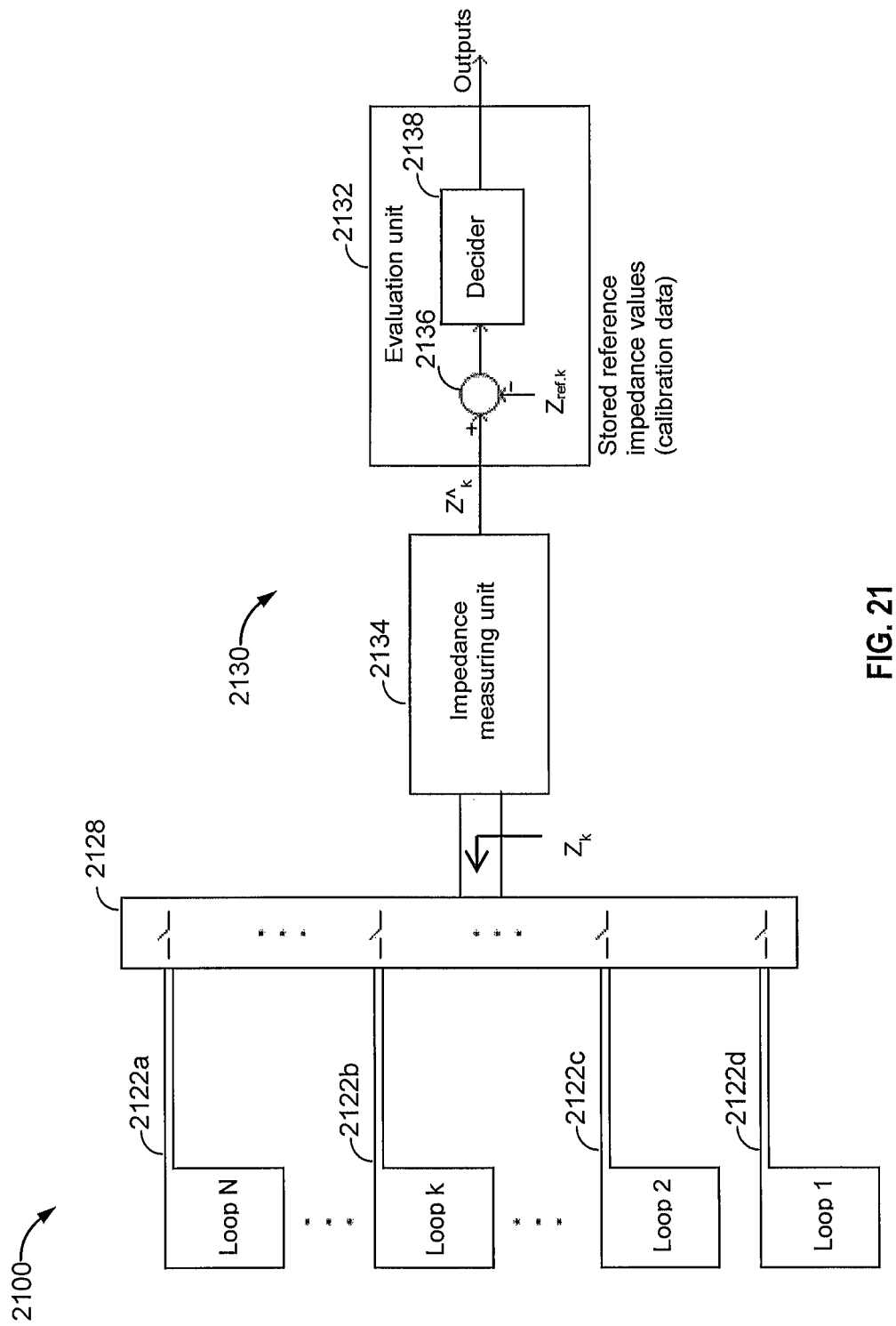
FIG. 21 is a functional block diagram of a circuit configured to detect an object based on sense coil impedance measurements, in accordance with some implementations.

FIG. 21 is a functional block diagram of a circuit 2100 configured to detect an object 624 based on sense coil impedance $Z_k$ measurements, in accordance with some implementations. The circuit 2100 may include several sense coils 2122a, 2122b, 2122c, and 2122d (referred to herein after collectively as sense coils 2122). The sense coils 2122 may form a part of an array of densely packed sense coils that cover an area to be protected in which metal objects may be detected. The circuit 2100 includes a detection circuit 2130 that selectively couples to each of the sense coils 2122 via a multiplexer 2128. The detection circuit 2130 includes an impedance measuring unit 2134. Impedance $Z_k$ at the port of the multiplexer 2128 is measured for each sense coil 2122 selected by the multiplexer 2128 sequentially and periodically via the impedance measuring unit 2134. The measured sense coil impedance value $Z_k$ of the sense coil is provided to an evaluation unit 2132, which includes a comparator 2136 and a decider 2138. The object 624 is detected based on a differential impedance obtained by subtracting a reference impedance value $Z_{ref,k}$ from the measured impedance value $Z_k$ for k=1 ... N as shown by the comparator 2136. The decider unit 2138 receives input from the comparator 2136 and determines whether an object is detected.

Figure 22:
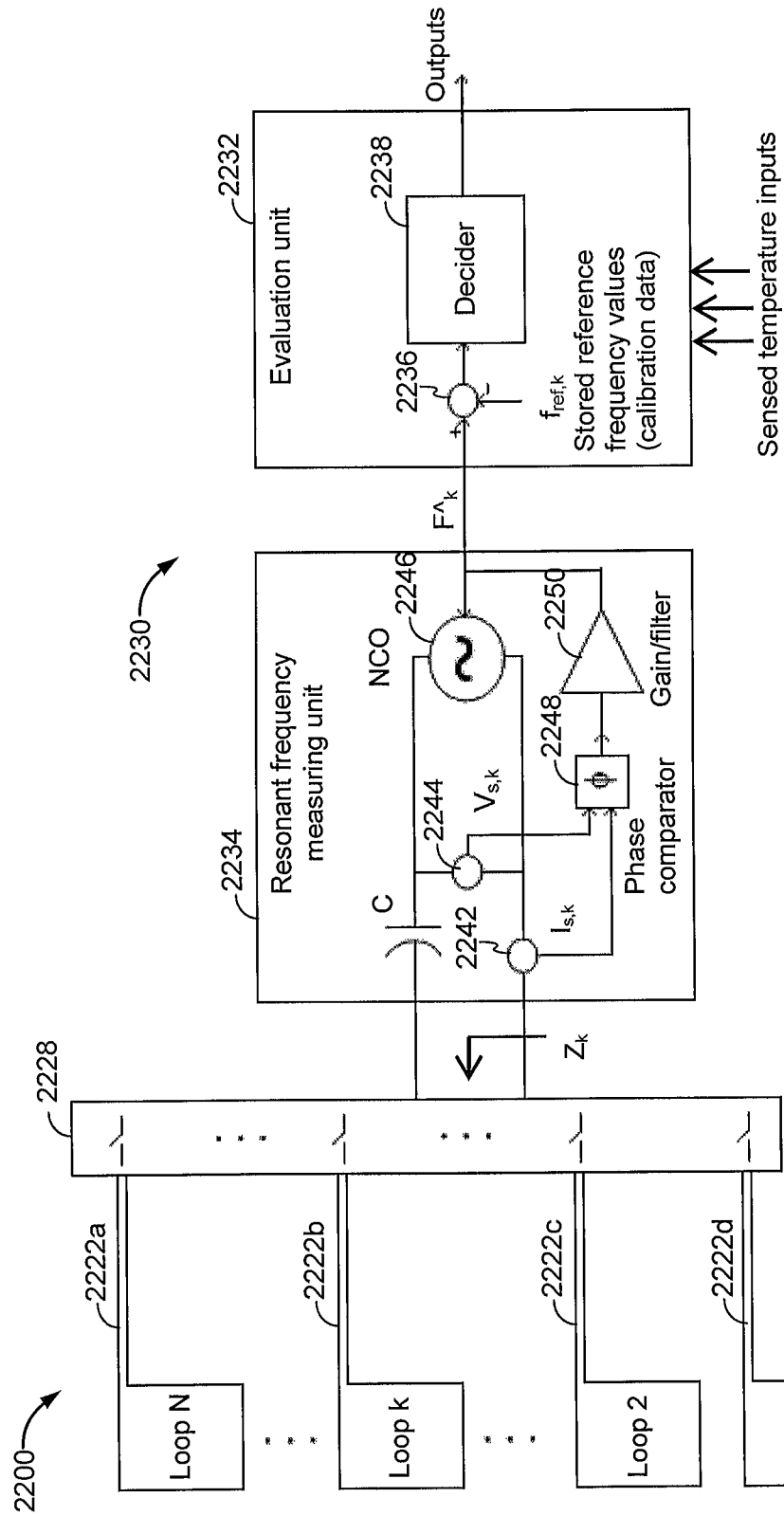
FIG. 22 is a functional block diagram of a circuit configured to detect an object based on sense coil resonant frequency measurements, in accordance with some implementations.

FIG. 22 is another functional block diagram of a circuit 2200 configured to detect an object 624 based on sense coil resonant frequency $F_k$ measurements, in accordance with some implementations. The circuit 2200 includes sense coils 2222a, 2222b, 2222c and 2222d (hereinafter referred to collectively as sense coils 2222) that may be part of an array of sense coils. In some implementations, the sense coils 2222 may substantially be configured to define a common plane over a predetermined area to be protected. The sense coils 2222 are coupled to a detection circuit 2230 via a multiplexer 2228 configured to selectively couple each of the sense coils 2222 to the detection circuit 2230. The detection circuit 2230 includes a resonant frequency measuring unit 2234 and an evaluation unit 2232. The resonant frequency measuring unit 2234 includes a capacitor C such that a sense coil 2222a coupled to the resonant frequency measuring unit 2234 forms a resonant circuit configured to resonant a particular resonant frequency. The resonant frequency measuring unit 2234 includes an oscillator 2246 configured to drive a coupled sense coil 2222a over a range of frequencies to cause the sense coil 2222a to resonate at a particular frequency $F_k$. The resonant frequency measuring unit 2234 further includes a phase comparator 2248 configured to detect a phase φ between a measured voltage $V_{s,k}$ and current $I_{s,k}$ (e.g., a zero-crossing of a phase function). In addition, a gain/filter 2250 may also be included.

The output of the resonant frequency measuring unit 2234 may correspond to a measured resonant frequency $F_k$ of a sense coil 2222a. This output is provided to the evaluation unit 2232 of the detection circuit 2230. The evaluation unit 2232 includes a comparator 2236 configured to compare the received measured resonant frequency value $F_k$ for a sense coil 2222a with a reference frequency value $F_k$. The output of the comparator 2236 is provided to a decider 2238 configured to determine, based at least in part on a difference between the measured value $F_k$ and reference value $F_{ref,k}$ if an object 624 is detected. Combining information from multiple sense coils 2222 may allow for determining position information regarding the object 624. In addition, as is further described below, the evaluation unit 2232 may receive sense temperature inputs to compensate for operating conditions other than foreign objects that may impact the measured resonant frequency $F_k$.

In some aspects, the resonant sense coil method as described with reference to FIG. 22 and further below (e.g., FIG. 23) may provide various benefits. For example, measuring a resonant frequency may be simpler and more accurate than measuring the impedance or inductance. A detection circuit 2230 may have less components and in some aspects may be limited to using the oscillator 2246 and the phase comparator 2248 detecting the phase between the measured voltage $V_{s,k}$ and the measured current $I_{s,k}$, e.g., the zero-crossing of the phase function. The capacitor C may also already be provided to suppress voltage induced by the strong alternating magnetic field used for wireless power transfer as present on the pad's surface and harmonics noise thereof. As such, adding the capacitor C does not add extra complexity. The resonance may act as a sense signal pre-conditioning (noise reduction) filter that also moves accordingly if a sense coil 2222a is detuned by a metal object. Any temperature drift or aging of the capacitor C may have a common effect on all resonant frequencies thus can be easily estimated and corrected in the evaluation unit 2232.

Figure 23:
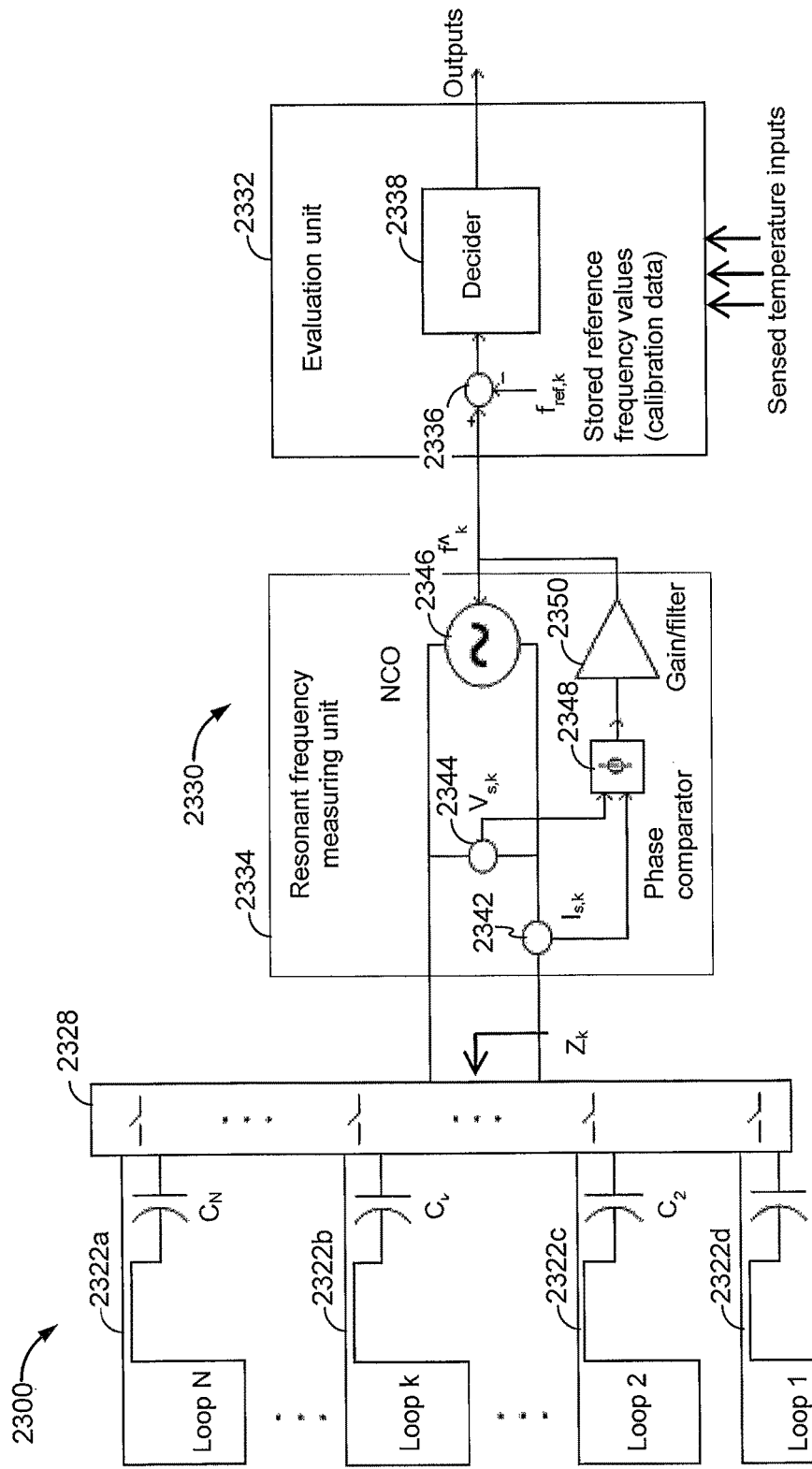
FIG. 23 is another functional block diagram of a circuit configured to detect an object based on sense coil resonant frequency measurements, in accordance with some implementations.

FIG. 23 is yet another functional block diagram of a circuit 2300 configured to detect an object 624 based on sense coil resonant frequency $F_k$ measurements, in accordance with some implementations. Each of the sense coils 2322a, 2322b, 2322c, and 2322d is electrically coupled to a resonance capacitor $C_1$, $C_2$, $C_k$, and $C_N$. As such, each resonant circuit includes the capacitor, e.g., $C_N$, of the coupling circuit 1426A and the corresponding sense coil 2322a. The capacitor $C_N$ is configured to reduce a variation of the resonant frequency $F_k$ by the multiplexer 2328 and further circuitry of the detection circuit 2330. For example, each capacitor $C_1$, $C_2$, $C_k$, and $C_N$ is configured to attenuate frequencies lower than the resonant frequency $F_k$, e.g., frequencies corresponding to the frequency of the magnetic field used for wireless power transfer. The capacitors $C_1$-$C_N$ further provide isolation between components of the detection circuit 2330 including the multiplexer 2328 and the sense coils 2322. The further components shown in FIG. 23 are similar to those described above with reference to FIG. 22. It is noted that with reference to the detection circuits 2230 and 2330 of FIGS. 22 and 23 and other detection circuits as described below, the detection circuits 2230 and 2330 may be configured to measure a characteristic dependent on or a function of the resonant frequency $F_k$ of each of the resonant circuits including the sense coils 2322. For example, in addition to measuring a frequency $F_k$ at which each resonant circuit resonates, a Q-factor or other characteristic may be measured and compared to stored corresponding Q-factors or other corresponding characteristics of the native resonant circuit (i.e., unchanged by external items) to determine the presence of the object 624.

In some aspects, the implementation shown in FIG. 23 may provide additional benefits. For example, the capacitance $C_1$-$C_N$ of each sense coil 2322 may remove the low frequency component as induced by the strong magnetic field on the pad's surface prior to multiplexing, thus relaxing requirements on the analog front-end circuitry, which preferably uses semiconductor (FET) type switches. It shall be appreciated that nonlinear distortion effects may occur in the multiplexer 2328 as the result of the low frequency induced that may reach several Volts. This is particularly true for multi-turn sense coils providing higher innate detection sensitivity but also higher induced voltages. Each capacitor may reduce variation of the resonant frequency $F_k$ that may be caused by the multiplexer 2328.

In one aspect, temperature drift of the sense coils' resonant frequencies $F_k$ may be unequal and specific for each sense coil 2322 therefore more difficult to assess and compensate for in the evaluation unit 2332. Using the capacitors $C_1$-$C_N$ with high temperature stability e.g., NP0 types, temperature drifts can be minimized and largely reduced to those of the sense coils 2322.

With reference to FIGS. 22 and 23, the high frequency oscillator 2246, 2346 for measuring the resonant frequency $F_k$ may be a Numerically Controlled Oscillator (NCO). An additional signal amplifier 2250, 2350 may be needed to generate sufficient sense current in the sense coils 2222, 2322 and as a buffer to provide a low impedance output (voltage source-like output). The low impedance output may be advantageous for preserving the Q-factor of the sense coil circuit and thus the slope of the phase function at resonance.

At least one voltage sensor 2244, 2344 and one current sensor 2242, 2342 are used to provide inputs for analyzing the impedance or phase function of the sense coil 2222a, 2322a as seen at the input port of the resonant frequency measuring unit 2234, 2334.

In some implementations, the phase comparator 2248, 2348 may implement a heterodyne receiver approach, e.g., by mixing the sense signals down to a narrow-band low intermediate frequency (IF) amplifier and performing phase comparison at IF. This approach may be chosen to increase the signal-to-noise ratio and thus measurement accuracy.

The resonant frequency search may be performed by a swept frequency generator using the oscillator 2246, 2346 e.g., starting at a frequency somewhat lower than the expected resonant frequency $F_k$ of the sense coil of concern and stopping the sweep when the differential phase φ reaches a predetermined value. To expedite the detection process and minimize response time, particularly in case of a large sensor array, the start frequencies may be derived from the reference values $F_{ref,k}$ as used in the evaluation unit 2232, 2332 minimizing sweep range, and thus minimizing sense time per sense coil.

Instead of a swept frequency generator, an impulse generator (not shown) or any other pseudo-random noise generator may be used to analyze the impedance function and measure the resonant frequency. Spectral analysis techniques such as Fourier Transform techniques (DFT, FFT, Görtzel algorithm) and similar techniques operating in the numeric domain may be used. These techniques may require sampling and digitizing the sense signals (voltage and current) using an adequate analog-to-digital converter.

To suppress sense coil induced transient noise as possibly generated by the energy transfer system, sweeping or pulsing may be performed in intervals between the low frequency switching transients. This method may effectively reduce noise without extra filtering requirements.

The implementations as described with reference to FIGS. 20-24 and further herein may be enhanced by adding temperature sensors (not shown) at different places e.g., in the charging pad (e.g., below the sense coil sensor array) and in the impedance measuring unit in order to increase stability against ambient temperature changes. Note that environmental requirements e.g., −30 to +80° C. may apply for a metal object detection solution that is integrated into an outdoor charging pad. Temperature as measured from different sensors may be used to pre-compensate measured impedance $Z_k$ or resonant frequency values $F_k$ using a temperature model. Alternatively or additionally, different stored reference values (e.g., $Z_{ref,k}$ or $F_{ref,k}$) applicable in defined temperature ranges may be used. These reference patterns may have been produced during manufacturing as part of a calibration procedure at different pad and ambient temperature levels.

Figure 24:
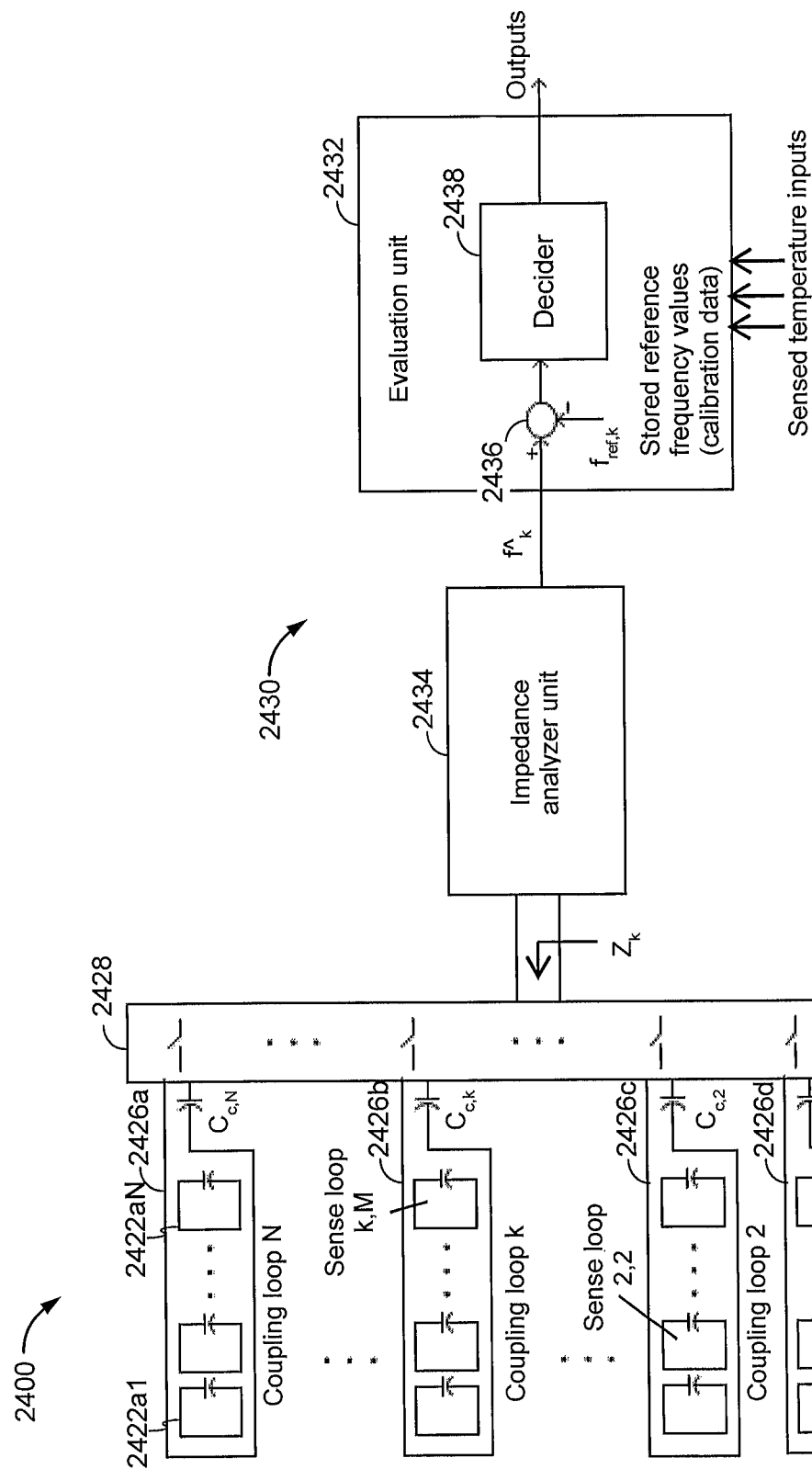
FIG. 24 is a functional block diagram of a circuit configured to detect an object using a plurality of coupling circuits between a detection circuit and plurality of sense circuits, in accordance with some implementations.

FIG. 24 is a functional block diagram of a circuit 2400 configured to detect an object using a coupling circuit between a detection circuit 2430 and a plurality of sense coils 2422, in accordance with some implementations. The circuit 2400 includes several coupling networks each including a coupling loop 2426a, 2426b, 2426c, and 2426d. Each of the coupling loops 2426a, 2426b, 2426c, and 2426d are inductively coupled to a plurality of sense circuits each having a sense coil and capacitance $C_{c,1}$ to $C_{c,N}$ (e.g., either self-capacitance or an added capacitor). For example, the coupling loop 2426a may form a coupling network including a plurality of sense circuits including sense circuits 2422a1 and 2422aN (referred to herein collectively as 2422 hereinafter). The coupling loops 2426a, 2426b, 2426c, and 2426d are coupled to a multiplexer 2428 such that each of the coupling networks is selectively coupled to a detection circuit 2430 configured to measure the resonant frequency $F_k$ of each sense circuit 2422 coupled to a particular coupling loop 2426a. The coupling loops 2426a, 2426b, 2426c, and 2426d are each configured to reduce variation of the resonant frequency $F_k$ of the each sense circuit 2422 by the detection circuit 2430. The detection circuit 2430 includes an impedance analyzer unit 2434 for measuring resonant frequencies $F_k$ and an evaluation unit 2432 for comparing measured values $F_k$ with reference values $F_{ref,k}$ and to determine information regarding objects sensed via the sense circuits 2422. The sense circuits 2422 may form a densely packed multi-dimensional array of sense coils in a plane configured to detect an object placed on a surface of the plane in which the sense circuits 2422 are configured. As noted above, detection circuit 2430 may measure other characteristic that are a function of the resonant frequencies $F_k$ of each of the sense circuits 2422.

In accordance with the implementation shown in FIG. 24, a plurality of sense coils are therefore combined to a group that is associated to a single, common coupling network. Furthermore, the sense coils 2422 are tuned to different resonant frequencies forming an impedance one port network with distinct poles and zeros, whose relevant pole and/or zero frequencies are distinguishable and measurable under operating conditions. Poles and zeros as resulting from such a network may be a highly complex function of each inductive and capacitive element including all cross coupling effects (mutual inductances) as they may occur between neighboring sense coils in a densely packed array. A metal object 626 placed on top of such a sense coil array generally changes some of the poles and zeros, which can be detected using an appropriate method e.g., comparing measured poles and zeros with a reference template.

The output of a magnetic field or impedance analyzer may have to be further processed in the evaluation unit 2432 of the detection circuit 2430. Besides subtracting reference/calibration values and making decisions, the evaluation unit 2432 may perform a modification on the measurement samples as delivered by the analyzer unit 2434. This modification may be part of a post processing method. An example of such a modification and a method is provided above for the case of the magnetic field sensing method (e.g., the least mean square method).

Similar methods may be also employed to enhance the sense coil impedance or sense coil resonant frequency sensing approach to compensate for residual effects e.g., from the vehicle pad, vehicle's underbody structure, temperature drift, dielectric objects (water, snow, ice, foliage), aging, etc.

These residual effects may be recognized in the patterns that are produced if measured values/samples are mapped onto a 2-dimensional array according to the array of sense coil sensors resulting in a 2-dimensional value matrix consisting of rows and columns. By using artificial intelligence including neuronal networks, fuzzy logic, etc., such effects may be effectively compensated or cancelled out increasing detection probability and/or reducing false alarm probability of the metal object detector.

Such methods may include detecting metal objects in their context or background pattern rather than using absolute detection criteria, e.g., automatically assessing the detection threshold and detection rules based on the background pattern. If the pattern appears noisy, meaning that time sequentially acquired patterns show a variance, a temporal and/or a spatial averaging technique may be applied, e.g., moving average, exponential decay averaging (e.g., $1^{st}$ order infinite response filter) over sequentially acquired patterns and/or spatial filtering or smoothing.

The decision threshold may be set lower e.g., for detecting sudden/abrupt and local changes in a measured pattern since such changes are unlikely to occur from temperature drift and aging or from a vehicle parking on the charging pad. This approach may provide increased sensitivity for detecting objects that enter the critical space when FOD is active.

Spatial interpolation over the array of samples e.g., over rows and columns may enhance detection particularly for small objects that are placed on corners or edges of sense coils where innate sensitivity may be lower. Using interpolation, an object positioned in the corner of four adjacent sense coils may provide a similar response as a coin positioned in the center of a sense coil.

Moreover, information from other sensors, vehicle positioning system, vehicle detection and identification system, power and efficiency measurements (power budget) on the energy transfer system may be taken into account in the pattern recognition and decision process.

Figure 25:
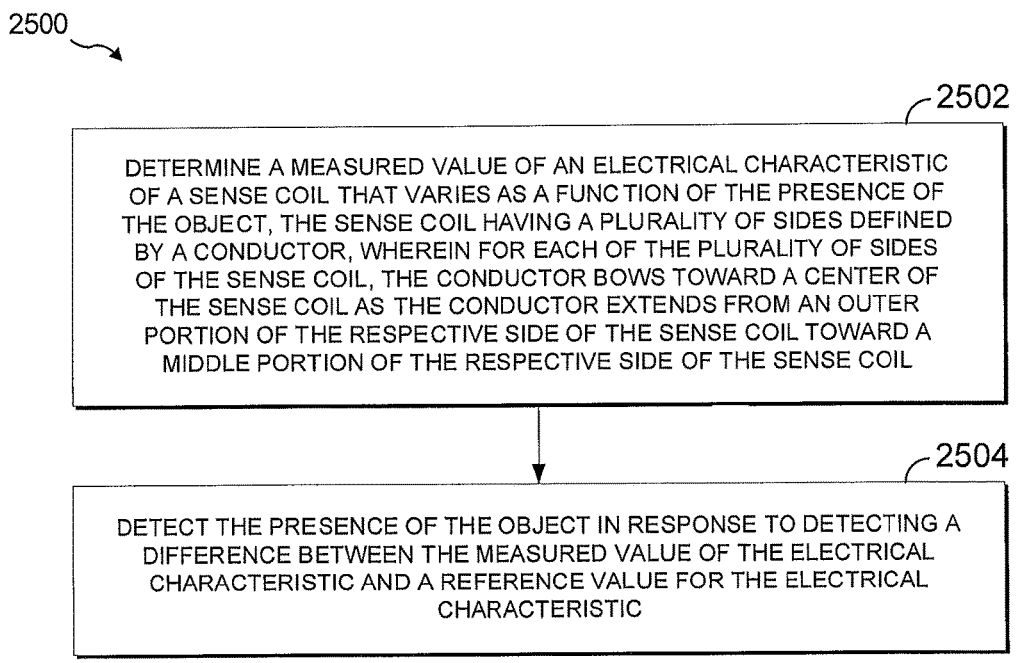
FIG. 25 is a flowchart of a method for detecting the presence of an object, in accordance with some implementations.

FIG. 25 is a flowchart 2500 of a method for detecting a presence of an object, in accordance with some implementations. The flowchart may begin at block 2502, which includes determining a measured value of an electrical characteristic of a sense coil that varies as a function of the presence of the object, the sense coil having a plurality of sides defined by a conductor, wherein for each of the plurality of sides of the sense coil, the conductor bows toward a center of the sense coil as the conductor extends from an outer portion of the respective side of the sense coil toward a middle portion of the respective side of the sense coil. For example, as previously described in connection with FIG. 20, the detection circuit 2030 may be configured to measure a voltage induced into the sense coils 2022 in order to measure a magnetic field strength $B_k$ at each of the sense coils 2022. As previously described in connection with FIG. 21, the detection circuit 2130 may be configured to measure an impedance $Z_k$ of the sense coils 2122. As previously described in connection with each of FIGS. 22-24, the detection circuits 2230, 2330, 2450 may be configured to measure a resonance frequency $F_k$ of the sense coils 2222, 2322, 2422, respectively. Moreover, as previously described in connection with any of FIGS. 11-13, the sense coils 1100, 1200, and 1300 the sense coil having a plurality of sides 1102, 1104, 1202, 1204, 1302, 1304 defined by a conductor 1120, 1220, 1320, wherein for each of the plurality of sides of the sense coil, the conductor bows toward a center 1110, 1201, 1310 of the sense coil as the conductor extends from an outer portion 1112 of the respective side of the sense coil toward a middle portion 1114 of the respective side of the sense coil. The flowchart 2500 may then advance to block 2504.

Block 2504 includes detecting the presence of the object in response to detecting a difference between the measured value of the electrical characteristic and a reference value for the electrical characteristic. For example, as previously described in connection with FIG. 20, the Comparator 2036 receives the measured magnetic field value $B_k$ and compares the value $B_k$ with a reference magnetic field value $B_{ref,k}$. As previously described in connection with any of FIGS. 21-24, the comparator 2136, 2236, 2336, 2456 receives the measured impedance value $Z_k$ and compares the value $Z_k$ with a reference impedance value $Z_{ref,k}$.

Figure 26:
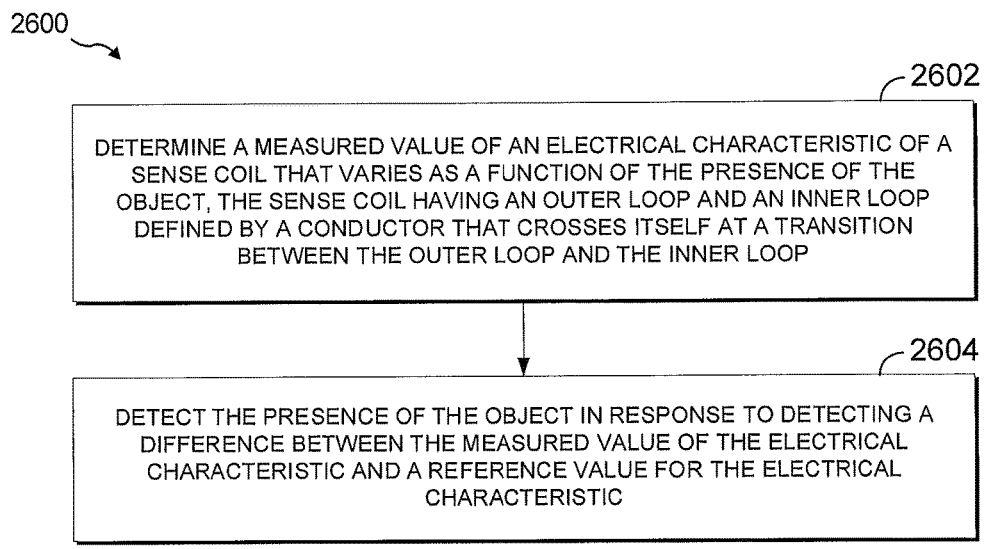
FIG. 26 is a flowchart of another method for detecting the presence of an object, in accordance with some implementations.

FIG. 26 is a flowchart 2600 of a method for detecting a presence of an object, in accordance with some implementations. The flowchart may begin at block 2602, which includes determining a measured value of an electrical characteristic of a sense coil that varies as a function of the presence of the object, the sense coil having an outer loop and an inner loop defined by a conductor that crosses itself at a transition between the outer loop and the inner loop. For example, as previously described in connection with FIG. 20, the detection circuit 2030 may be configured to measure a voltage induced into the sense coils 2022 in order to measure a magnetic field strength $B_k$ at each of the sense coils 2022. As previously described in connection with FIG. 21, the detection circuit 2130 may be configured to measure an impedance $Z_k$ of the sense coils 2122. As previously described in connection with each of FIGS. 22-24, the detection circuits 2230, 2330, 2450 may be configured to measure a resonance frequency $F_k$ of the sense coils 2222, 2322, 2422, respectively. Moreover, as previously described in connection with FIG. 7, the sense coil 700 has an outer loop 702 and an inner loop 704 defined by a conductor that crosses itself at a transition 706 between the outer loop and the inner loop. The flowchart 2600 may then advance to block 2604.

Block 2604 includes detecting the presence of the object in response to detecting a difference between the measured value of the electrical characteristic and a reference value for the electrical characteristic. For example, as previously described in connection with FIG. 20, the comparator 2036 receives the measured magnetic field value $B_k$ and compares the value $B_k$ with a reference magnetic field value $B_{ref,k}$. As previously described in connection with any of FIGS. 21-24, the comparator 2136, 2236, 2336, 2456 receives the measured impedance value $Z_k$ and compares the value $Z_k$ with a reference impedance value $Z_{ref,k}$.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and method steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features s have been described herein. It is to be understood that not necessarily all such advantages may be achieved in accordance with any particular implementation. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus for detecting a presence of an object, the apparatus comprising:
a sense coil having a plurality of sides defined by a conductor, wherein for each of the plurality of sides of the sense coil, the conductor bows toward a center of the sense coil as the conductor extends from an outer portion of the respective side of the sense coil toward a middle portion of the respective side of the sense coil, and wherein the sense coil has an electrical characteristic that varies as a function of the presence of the object; and
a detection circuit coupled to the sense coil and configured to detect the presence of the object in response to detecting a difference between a measured value of the electrical characteristic and a reference value for the electrical characteristic.

2. The apparatus of claim 1, wherein the reference value for the electrical characteristic is substantially the same as the measured value of the electrical characteristic in the absence of the object over at least a portion of the sense coil.

3. The apparatus of claim 1, wherein a shape of the sense coil decreases a difference between a maximum measurable value of the electrical characteristic when the object is located over at least a portion of the sense coil and the measured value of the electrical characteristic when the object is located substantially over a center of the sense coil as compared to a substantially rectangular sense coil.

4. The apparatus of claim 1, wherein at each corner of corresponding sides of the coil, the conductor is bent at an acute angle with respect to a direction of extension of each of the corresponding sides to form substantially rounded corners.

5. The apparatus of claim 4, wherein the acute angle is substantially 45°.

6. The apparatus of claim 1, wherein at each corner of corresponding sides of the coil, the conductor is bent at a substantially 90 degree angle with respect to a direction of extension of each of the corresponding sides.

7. The apparatus of claim 1, wherein the conductor of the coil forms a plurality of windings and for at least one winding on one side of the plurality of sides of the coil, the conductor extends in a substantially straight line along the entire side.

8. The apparatus of claim 1, wherein the conductor of the coil forms a plurality of windings and wherein successive windings of the plurality of windings bow toward a center of the coil to an increasing extent from an outermost winding to an innermost winding.

9. The apparatus of claim 1, wherein the conductor of the coil forms a plurality of windings and wherein the conductor extends in a substantially straight line along an entirety of each of the plurality of sides for at least one of the plurality of windings.

10. The apparatus of claim 1, wherein the middle portion of opposite sides of the coil are closer to one another than the outer portion of the opposite sides of the coil are to one another.

11. The method of claim 1, wherein the reference value for the electrical characteristic is substantially the same as the measured value of the electrical characteristic in the absence of the object over at least a portion of the sense coil.

12. A method for detecting a presence of an object, the method comprising:
   determining a measured value of an electrical characteristic of a sense coil that varies as a function of the presence of the object, the sense coil having a plurality of sides defined by a conductor, wherein for each of the plurality of sides of the sense coil, the conductor bows toward a center of the sense coil as the conductor extends from an outer portion of the respective side of the sense coil toward a middle portion of the respective side of the sense coil, and
   detecting the presence of the object in response to detecting a difference between the measured value of the electrical characteristic and a reference value for the electrical characteristic.

13. The method of claim 12, wherein a shape of the sense coil decreases a difference between a maximum measurable value of the electrical characteristic when the object is located over at least a portion of the sense coil and the measured value of the electrical characteristic when the object is located substantially over a center of the sense coil as compared to a substantially rectangular sense coil.

14. The method of claim 12, wherein at each corner of corresponding sides of the coil, the conductor is bent at an acute angle with respect to a direction of extension of each of the corresponding sides to form substantially rounded corners.

15. The method of claim 14, wherein the acute angel is substantially 45°.

16. The method of claim 12, wherein at each corner of corresponding sides of the coil, the conductor is bent at a substantially 90 degree angle with respect to a direction of extension of each of the corresponding sides.

17. The method of claim 12, wherein the conductor of the coil forms a plurality of windings and for at least one winding on one side of the plurality of sides of the coil, the conductor extends in a substantially straight line along the entire side.

18. The method of claim 12, wherein the conductor of the coil forms a plurality of windings and wherein successive windings of the plurality of windings bow toward a center of the coil to an increasing extent from an outermost winding to an innermost winding.

19. The method of claim 12, wherein the conductor of the coil forms a plurality of windings and wherein the conductor extends in a substantially straight line along an entirety of each of the plurality of sides for at least one of the plurality of windings.

20. The method of claim 12, wherein the middle portion of opposite sides of the coil are closer to one another than the outer portion of the opposite sides of the coil are to one another.

* * * * *